US012122071B2

(12) United States Patent
Smith et al.

(10) Patent No.: US 12,122,071 B2
(45) Date of Patent: Oct. 22, 2024

(54) THERMOPLASTIC FORMING TOOLS, AND ASSEMBLAGES THEREOF

(71) Applicant: EDGE EMBOSSING, INC., Charlestown, MA (US)

(72) Inventors: Brian Alexander Smith, Charlestown, MA (US); Andrew Evan Kamholz, Charlestown, MA (US); Cameron John Harris, Charlestown, MA (US); Hootan Farhat, Charlestown, MA (US)

(73) Assignee: EDGE EMBOSSING, INC., Charlestown, MA (US)

( * ) Notice: Subject to any disclaimer, the term of this patent is extended or adjusted under 35 U.S.C. 154(b) by 112 days.

(21) Appl. No.: 17/297,363

(22) PCT Filed: Nov. 26, 2019

(86) PCT No.: PCT/US2019/063338
§ 371 (c)(1),
(2) Date: May 26, 2021

(87) PCT Pub. No.: WO2020/112835
PCT Pub. Date: Jun. 4, 2020

(65) Prior Publication Data
US 2021/0402659 A1     Dec. 30, 2021

Related U.S. Application Data

(60) Provisional application No. 62/771,322, filed on Nov. 26, 2018.

(51) Int. Cl.
*B29C 33/42*     (2006.01)
*B29C 33/40*     (2006.01)
(Continued)

(52) U.S. Cl.
CPC .......... *B29C 33/424* (2013.01); *B29C 33/405* (2013.01); *B29C 43/3607* (2013.01);
(Continued)

(58) Field of Classification Search
CPC . B29C 2059/023; B29C 33/405; B29C 33/50; B29C 33/56; B29C 2043/025
See application file for complete search history.

(56) References Cited

U.S. PATENT DOCUMENTS 4,312,823 A * 1/1982 Kraakman ............... G11B 3/70
                                                                                             425/389
4,415,138 A * 11/1983 Jarsen ................ G11B 23/0057
(Continued)

OTHER PUBLICATIONS

Zhao X-M et al: "Soft lithographic methods for nano-fabrication", Journal of Materials Chemistry, Royal Society of Chemistry, GB, vol. 7, No. 7, Jul. 1, 1997 (Jul. 1, 1997), pp. 1069-1074, XP002294828, ISSN: 0959-9428, DOI: 10.1039/A700145B.

*Primary Examiner* — Benjamin A Schiffman
(74) *Attorney, Agent, or Firm* — Johnson, Marcou, Isaacs & Nix, LLC; John S. Sears

(57) ABSTRACT

Thermoplastic forming tools and assemblages are provided for forming thermoplastic components. In particular, thermoplastic forming tools and assemblages are provided for forming thermoplastic components having precision micro-scale features and reproducible macro-scale dimensions. The thermoplastic forming assemblages can include at least a bottom tool and a top tool having a rigid tool body and an elastomer layer conformally coating at least a portion of both rigid tool bodies. The bottom and top tool can be so dimensioned that, when in the closed position, they define a cavity forming the thermoplastic component. The rigid tool bodies provide the reproducible macro-scale dimensions in the thermoplastic component, while the elastomer layers form and release the precision micro-scale features in the (Continued)

thermoplastic component when formed. Tool-forming structures are also provided for making thermoplastic forming tools and assemblages, as well as methods of making the thermoplastic forming tools, and methods of use for forming thermoplastic components.

24 Claims, 39 Drawing Sheets

(51) Int. Cl.
  *B29C 43/36* (2006.01)
  *B29C 43/52* (2006.01)
  *B29C 45/26* (2006.01)
  *B29C 59/02* (2006.01)

(52) U.S. Cl.
  CPC ......... *B29C 43/52* (2013.01); *B29C 45/2608* (2013.01); *B29C 45/263* (2013.01); *B29C 45/2632* (2013.01); *B29C 45/2642* (2013.01); *B29C 59/022* (2013.01); *B29C 2059/023* (2013.01)

(56) References Cited

U.S. PATENT DOCUMENTS

| | | | | |
|---|---|---|---|---|
| 6,439,874 | B1* | 8/2002 | Buzzeo | C11D 13/18 425/395 |
| 6,652,792 | B1* | 11/2003 | Klein | C11D 13/28 425/102 |
| 6,797,091 | B2* | 9/2004 | Lines | H01M 8/0206 156/286 |
| 7,291,004 | B2* | 11/2007 | Kang | B82Y 10/00 |
| 2004/0089965 | A1* | 5/2004 | Malfliet | B29C 33/44 264/331.19 |
| 2004/0241049 | A1 | 12/2004 | Carvalho | |
| 2007/0063378 | A1 | 3/2007 | O'Donoghue | |
| 2009/0061039 | A1* | 3/2009 | Zhang | B29C 33/3857 425/436 R |
| 2009/0273119 | A1* | 11/2009 | Imai | B29C 37/005 264/293 |
| 2010/0009127 | A1 | 1/2010 | Kariyada | |
| 2010/0172898 | A1 | 7/2010 | Doyle et al. | |
| 2012/0292804 | A1 | 11/2012 | Carvalho et al. | |
| 2016/0096176 | A1 | 4/2016 | Jarvius et al. | |
| 2021/0101316 | A1* | 4/2021 | Lee | B29C 59/022 |
| 2023/0330915 | A1* | 10/2023 | Smith | B29C 33/424 |

* cited by examiner

THERMOPLASTIC FORMING TOOLS, AND ASSEMBLAGES THEREOF

CROSS-REFERENCE TO RELATED APPLICATIONS

This application is the 35 U.S.C. § 371 national stage application of PCT Application No. PCT/US2019/063338, filed Nov. 26, 2019, where the PCT claims priority to, and the benefit of, U.S. provisional application entitled "THERMOPLASTIC FORMING TOOLS, ASSEMBLAGES THEREOF, AND METHODS OF MAKING AND METHODS OF USE THEREOF" having Ser. No. 62/771,322, filed Nov. 26, 2018, both of which are herein incorporated by reference in their entireties.

TECHNICAL FIELD

The present disclosure generally relates to tools and methods for polymer fabrication, e.g. tools and methods for embossing and injection molding.

BACKGROUND

Disposable devices with microscale features are now commonplace among applications ranging from diagnostics to life sciences to point-of-care medical devices. The success of such devices as products depends, in part, on both the cost and quality of manufacture of the device. The technologies used in these devices often include one or more microscale structures ("microstructures") such as microchannels, micropillars, microposts, microwells, nanowells, and numerous others well-known in relevant published literature. Many such devices conduct fluids for the purpose of performing assays, tests, measurements, or other observations on the fluid, which can consist of any biological fluid or other fluids prepared in a laboratory or clinical setting.

Typical microfeatures have strict geometric requirements that are straightforward to achieve with microfabrication and other lithography techniques, but these fabrication processes result in devices too expensive to be considered disposable. Thermoplastics are often used as a substitute for silicon, glass, and similar substrates used in microfabrication and lithography. However, current methods for fabrication of thermoplastic parts are usually unable to meet the geometric requirements of the microfeatures such that yield the intended function. In particular, existing methods for fabrication of thermoplastic parts are not able to create thermoplastic parts having both the needed degree of precision in the micro-scale features and, at the same time, having reproducible macro-scale dimensions with little variation.

Thus, there remains a need for improved tools and methods for forming thermoplastic components that overcome the aforementioned deficiencies.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 1A is a perspective view of a top tool of the first exemplary thermoplastic forming assemblage. FIG. 1B is a section view along the line 1-1 of the top tool of FIG. 1A. FIG. 1C is a perspective view of a bottom tool of the first exemplary thermoplastic forming assemblage. FIG. 1D is a section view along the line 2-2 of the bottom tool of FIG. 1C. FIG. 1E is a perspective view of the first exemplary thermoplastic forming assemblage showing the top tool of FIG. 1A and the bottom tool of FIG. 1C in a closed position. FIG. 1F is an exploded top isometric perspective view of the first exemplary thermoplastic forming assemblage. FIG. 1G is an exploded bottom isometric perspective view of the first exemplary thermoplastic forming assemblage. FIG. 1H is a section view along the line 3-3 of the first exemplary thermoplastic forming assemblage showing the top tool of FIG. 1A and the bottom tool of FIG. 1C in a closed position to form a cavity.

FIG. 3A is a perspective view of the bottom tool with the exemplary embossing blank in place in the recess. FIG. 3B is a side section view along the line 4-4 of the bottom tool with the exemplary embossing blank in place in the recess. FIG. 3C is a perspective view of the first exemplary thermoplastic forming assemblage showing the top tool of FIG. 1A and the bottom tool of FIG. 1C in a closed position with the exemplary embossing blank in place in the cavity. FIG. 3D is a side section view along the line 5-5 of the first exemplary thermoplastic forming assemblage showing the top tool of FIG. 1A and the bottom tool of FIG. 1C in a closed position with the exemplary embossing blank in place in the cavity. FIG. 3E is a close-up section view of the region marked 1 in FIG. 3D. FIG. 3F is a close-up section view of the region marked 2 in FIG. 3D.

FIG. 5A is a perspective view of a bottom tool of the second exemplary thermoplastic forming assemblage. FIG. 5B is a perspective view of a top tool of the second exemplary thermoplastic forming assemblage. FIG. 5C is a perspective view of the second exemplary thermoplastic forming assemblage showing the bottom tool of FIG. 5A and the top tool of FIG. 5B in a closed position. FIG. 5D is an exploded top isometric perspective view of the second exemplary thermoplastic forming assemblage. FIG. 5E is an exploded bottom isometric perspective view of the second exemplary thermoplastic forming assemblage.

FIG. 6A is a perspective view of a bottom tool of the third exemplary thermoplastic forming assemblage and having one top tool in a closed position. FIG. 6B is a perspective view of the third exemplary thermoplastic forming assemblage showing the bottom tool of FIG. 6A with all three of the top tools in a closed position. FIG. 6C is an exploded top isometric perspective view of the third exemplary thermoplastic forming assemblage. FIG. 6D is an exploded bottom isometric perspective view of the third exemplary thermoplastic forming assemblage.

FIG. 7A is a perspective view of a bottom tool of the fourth exemplary thermoplastic forming assemblage. FIG. 7B is a perspective view of the fourth exemplary thermoplastic forming assemblage showing the bottom tool of FIG. 7A with the top tool in a closed position. FIG. 7C is a close up of a side section view along the line 6-6 in the region marked 3 of the fourth exemplary thermoplastic forming assemblage showing a through-hole forming feature.

FIG. 8A is a perspective view of a bottom tool of the fifth exemplary thermoplastic forming assemblage. FIG. 8B is a perspective view of a top tool of the fifth exemplary thermoplastic forming assemblage.

FIG. 8C is a perspective view of the fifth exemplary thermoplastic forming assemblage showing the bottom tool of FIG. 8A with the top tool of FIG. 8B in a closed position. FIG. 8D is a close up of a side section view along the line 7-7 in the region marked 4 of the fifth exemplary thermoplastic forming assemblage showing a through-hole forming feature, with the tool in a slightly open or separated position to more clearly show the through-hole forming features. FIG. 8E is a close up of a side section view along the line 7-7 in the region marked 4 of the fifth exemplary thermoplastic forming assemblage showing a through-hole forming feature, with the tool in a closed position.

FIG. 12A is a perspective view of the first exemplary tool-forming structure. FIG. 12B is a perspective view of an exemplary insert for use in the first exemplary tool-forming structure. FIG. 12C is a perspective view of the first exemplary tool-forming structure of FIG. 12A including the insert of FIG. 12B. FIG. 12D is a section view along the line 8-8 of the first exemplary tool-forming structure including the insert. FIG. 12E is an exemplary rigid tool body for forming a top tool using the first exemplary tool-forming structure according to various aspects of the disclosure. FIG. 12F is a perspective view of the first exemplary tool-forming structure of FIG. 12A including both the insert of FIG. 12B and the rigid tool body of FIG. 12E as they would appear during the elastomer casting. FIG. 12G is an exploded top isometric perspective view of the first exemplary tool-forming structure including both the insert and the rigid tool body as they would appear during the elastomer casting. FIG. 12H is an exploded bottom isometric perspective view of the first exemplary tool-forming structure including both the insert and the rigid tool body as they would appear during the elastomer casting. FIG. 12I is a side view of the first exemplary tool-forming structure including both the insert and the rigid tool body as they would appear during the elastomer casting. FIG. 12J is a section view along the line 9-9 of the first exemplary tool-forming structure including both the insert and the rigid tool body as they would appear during the elastomer casting. FIG. 12K is a section view along the line 9-9 of the first exemplary tool-forming structure including both the insert and the rigid tool body as they would appear during the elastomer casting and showing the elastomer layer conformally coating a portion of the rigid tool body.

FIG. 13A is a perspective view of the first exemplary tool-forming structure. FIG. 13B is a perspective view of an exemplary optical insert for use in the second exemplary tool-forming structure. FIG. 13C is a perspective view of the second exemplary tool-forming structure of FIG. 13A including the insert of FIG. 13B. FIG. 13D is a section view along the line 10-10 of the second exemplary tool-forming structure including the insert. FIG. 13E is an exemplary rigid tool body for forming a bottom tool using the second exemplary tool-forming structure according to various aspects of the disclosure. FIG. 13F is a perspective view of the second exemplary tool-forming structure of FIG. 13A including both the insert of FIG. 13B and the rigid tool body of FIG. 13E as they would appear during the elastomer casting. FIG. 13G is an exploded top isometric perspective view of the second exemplary tool-forming structure including both the insert and the rigid tool body as they would appear during the elastomer casting. FIG. 13H is an exploded bottom isometric perspective view of the second exemplary tool-forming structure including both the insert and the rigid tool body as they would appear during the elastomer casting. FIG. 13I is a side view of the second exemplary tool-forming structure including both the insert and the rigid tool body as they would appear during the elastomer casting. FIG. 13J is a section view along the line 10-10 of the second exemplary tool-forming structure including both the insert and the rigid tool body as they would appear during the elastomer casting. FIG. 13K is a section view along the line 10-10 of the second exemplary tool-forming structure including both the insert and the rigid tool body as they would appear during the elastomer casting and showing the elastomer layer conformally coating a portion of the rigid tool body.

DETAILED DESCRIPTION

Figure 1A:
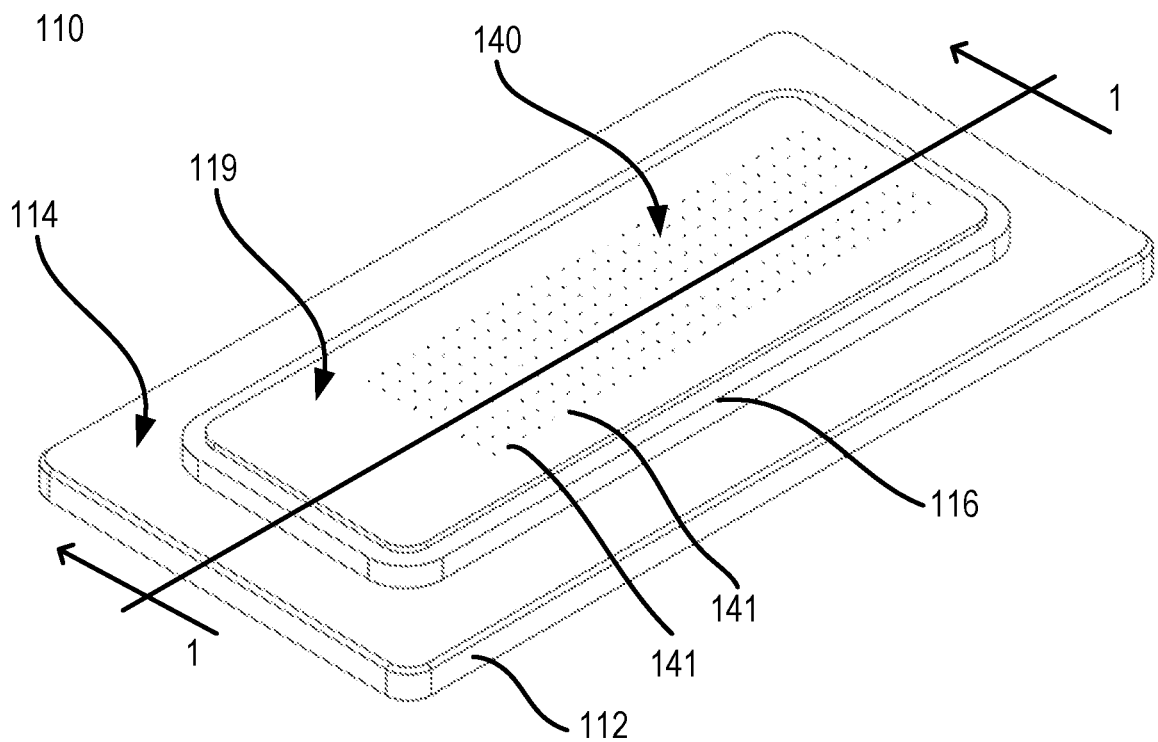
FIGS. 1A-1H are various views of a first exemplary thermoplastic forming assemblage for forming a thermoplastic component according to the various aspects of the disclosure.
Figure 1B:
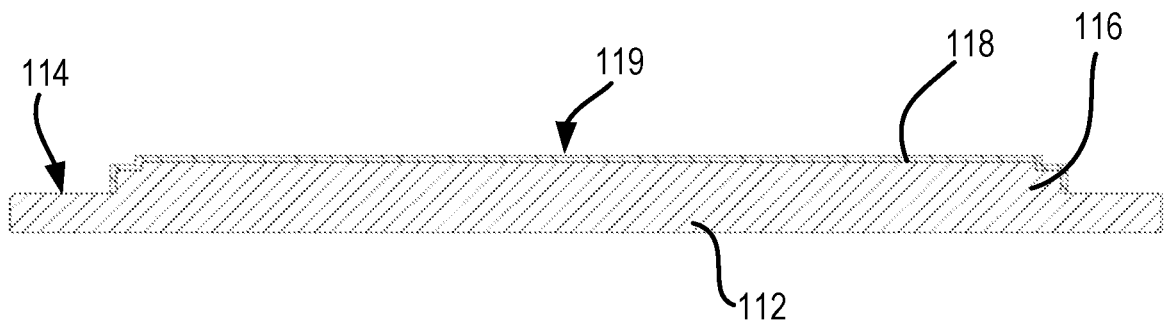
Figure 1C:
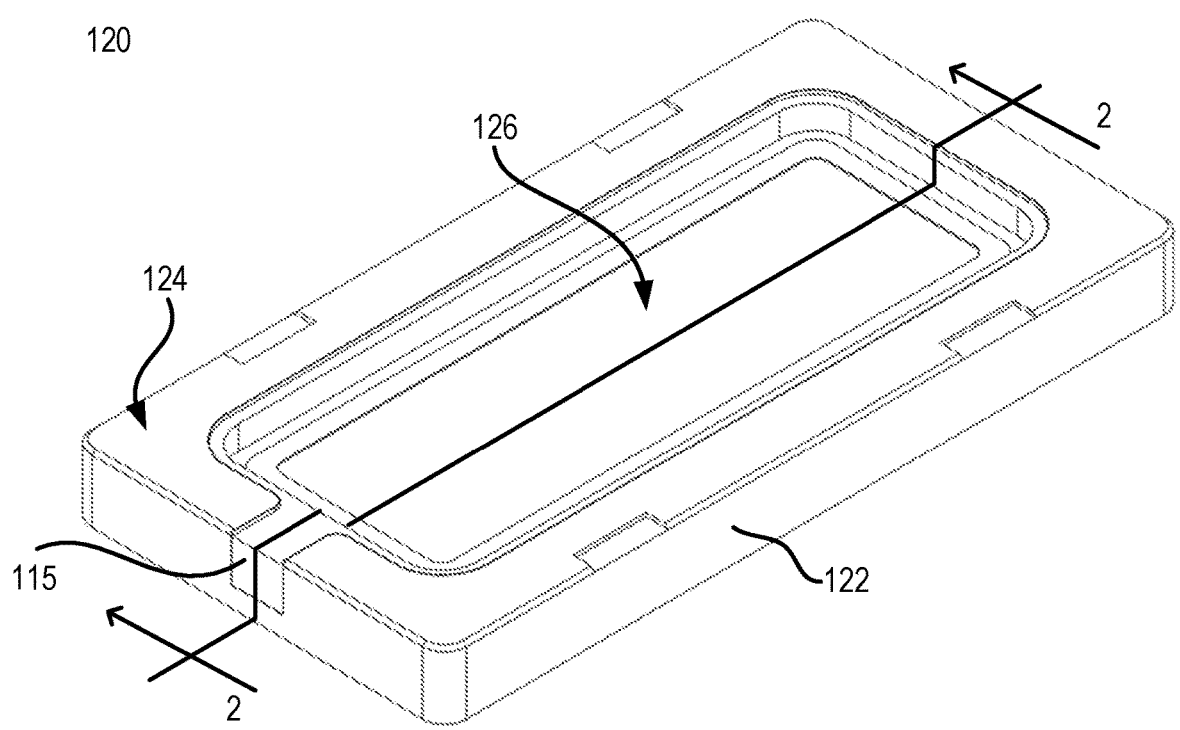
Figure 1D:
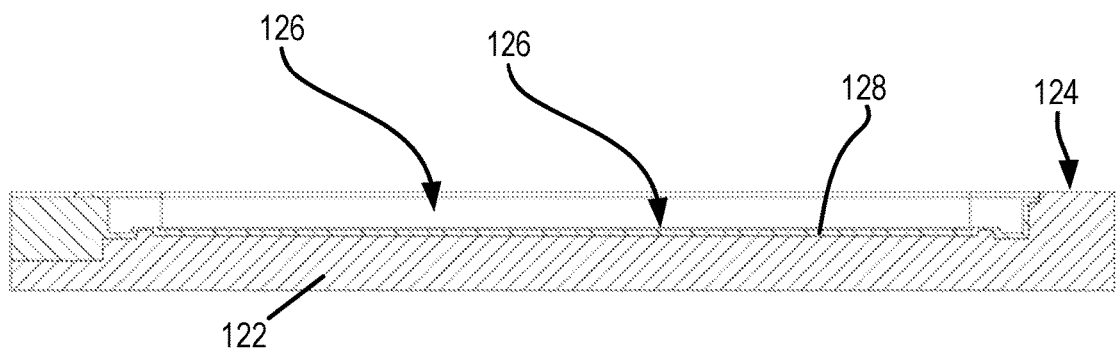

Thermoplastic forming tools and assemblages thereof are provided that overcome one or more of the aforementioned deficiencies. In particular, thermoplastic forming assemblages are provided that can produce thermoplastic components with greater precision in micro-scale features and greater reproducibility in macro-scale dimensions than conventional tools and methods of embossing. Methods of forming components, e.g. through embossing or injection molding, using the tools are also provided. Structure and methods are also provided for making the thermoplastic forming tools and assemblages.

In some aspects, a thermoplastic forming assemblage is provided for forming a thermoplastic component having precision micro-scale features and reproducible macro-scale dimensions, the thermoplastic forming assemblage having (a) a top tool having a first rigid tool body having a first cavity-forming side; and a first elastomer layer conformally coating at least a portion of the first cavity-forming side to create a first cavity-forming surface; and (b) a bottom tool having a second rigid tool body have a second cavity-forming side and a second elastomer layer conformally coating at least a portion of the second cavity-forming side to create a second cavity-forming surface; wherein, when in a closed position, the first cavity-forming surface and the second cavity-forming surface define a cavity for forming the thermoplastic component; wherein one or both of the first cavity-forming surface and the second cavity-forming surface comprise a feature-forming surface that define the precision micro-scale features when forming the thermoplastic component; wherein the first rigid tool body and the second rigid tool body are effective to provide the reproducible macro-scale dimensions in the thermoplastic component when formed; and wherein the first elastomer layer and the second elastomer layer are effective to form the precision micro-scale features in the thermoplastic component and to release the precision micro-scale features when formed.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The "draft angle", as the term is used herein, is an angle defined in terms of the mold or feature surfaces and a theoretical central axis along the direction of pull removal. In conventional molding, a positive draft angle is typically designed into all vertical walls to make ejection of the part from the mold easier. A draft angle is said to be a "positive draft angle" when the walls of the mold or feature slope away in the direction of pull from a theoretical central axis of the mold or feature. A draft angle is said to be a "negative draft angle" when the walls of the mold or feature slope inward in the direction of pull from a theoretical central axis of the mold or feature. A featured surface can include both features having a positive draft angle and features having a negative draft angle. A "non-negative draft angle" refers to a mold or feature having a zero draft angle or a positive draft angle.

The terms "micro-scale feature," as used herein, refers to a feature having one or more dimensions of about 10,000 micrometers, about 1,000 micrometers or less and generally having dimensions larger than about 10 nanometers, 100 nanometers, or larger. In some instances, micro-scale features have a largest dimension of about 10 micrometers or about 50 micrometers to about 100 micrometers or about 250 micrometers.

The term "macro-scale" as used herein, refers to the overall dimensional features of a thermoplastic component which are typically dimensions of 1 millimeter or more, more precisely dimensions from about 1 millimeter, 5 millimeters, or 10 millimeters and up to about 20 millimeters, 100 millimeters, 500 millimeters, or even 1,000 millimeters.

The term "precision micro-scale features," as used herein, refers to a micro-scale feature having an exceedingly small root mean square (RMS) deviation in micro-scale feature sizes as measured over multiple thermoplastic components. In some aspects, a precision micro-scale feature has RMS deviations of about 10 micrometers, about 1 micrometer, or less. In some aspects, a precision micro-scale feature has RMS deviations of about 10%, about 5%, about 1%, about 0.1% or less.

The term "reproducible macro-scale dimensions" refers to the repeatability of macro-scale dimensions between thermoplastic components as measured over multiple thermoplastic components. In some aspects, a macro-scale dimension is said to be reproducible when a root mean square (RMS) deviation of all or substantially all of the macro-scale dimensions is within a tolerance of 1%, 0.1%, 0.01%, 0.001%, 0.0001%, or less.

The term "rigid," as used herein, refers to a material or component that can withstand bending or deformation of shape when exposed to typical pressures used in embossing and injection molding, e.g. having a modulus of rigidity of at least 10 GPa, 20 GPa, 25 GPa, 30 GPa or more.

Thermoplastic Forming Tools and Assemblages Thereof

In various aspects, thermoplastic forming tools and assemblages thereof are provided. The tools and assemblages can be used for forming thermoplastic components with precisely dimensioned micro-scale features, even with high aspect ratios, while also maintaining long-range macro-scale reproducibility of the component. By combining rigid tooling with thin elastomer layers on the cavity-forming surface, the tools described herein are capable of achieving the benefits of both rigid hard tool embossing and soft tool embossing approaches.

The tools are often described herein as having at least one top tool and at least one bottom tool, but it should be understood that such reference as top and bottom is, in some aspects at least, somewhat arbitrary and done so only for the sake of clarity. Such language should not be taken to mean the top tool must necessarily be spatially above the bottom tool in all applications, although in some aspects this will be true.

In some aspects, a thermoplastic forming assemblage for forming a thermoplastic component is provided. The assemblages are capable of forming components having precision micro-scale features and reproducible macro-scale dimensions. In various aspects, the thermoplastic forming assemblage includes both a bottom tool and a top tool. In some aspects, when the tool include multiple wells for forming multiple components, the assemblage can include multiple top tools. For example, in some aspects the assemblage has 3, 4, or more cavities and an equal number of top tools.

The top tool and the bottom tool come together to form a cavity for forming the thermoplastic component. In some aspects, the top tool includes a first rigid tool body having a first cavity-forming side with at least one protrusion. The top tool can also include a first elastomer layer conformally coating the at least one protrusion to create a first cavity-forming surface. The thermoplastic forming assemblage will also have a bottom tool. In some aspects, the bottom tool includes a second rigid tool body having a second-cavity forming side with at least one recess, wherein the at least one recess is configured to receive the at least one protrusion of the top tool when the assemblage is in a closed position. In some aspects, the bottom tool includes a second elastomer layer conformally coating the at least one recess to create a second cavity-forming surface. When the assemblage is in the closed position, the first cavity-forming surface and the second cavity-forming surface can define a cavity for forming the thermoplastic component.

The tools and assemblages can be used to form thermoplastic components with precision micro-scale features. In some aspects, one or both of the first cavity-forming surface and the second cavity-forming surface include a feature-forming surface that define the precision micro-scale features when forming the thermoplastic component. The feature-forming surface can include wells, pillars, dimples, pores, channels, ridges, more complex geometric structures, or any combination thereof.

The hybrid tooling approach that combines a rigid tool body with a thin elastomer coating allows for tighter dimensional control across all feature sizes than can be achieved by either rigid tooling or elastomeric tooling alone. Geometric features of thermoplastic parts can generally be defined as macro-scale or micro-scale. Features defined as macro-scale typically have a length, width, height, pitch, and radius of curvature of at least 1 millimeter. Features defined as micro-scale typically have at least one characteristic from the set of length, width, height, pitch, or radius of curvature that is less than one millimeter. Rigid tooling without elastomer coating typically can produce thermoplastic parts with macro-features that vary by less than 0.1% from part to part, but typically cannot produce most types of micro-features without large variations (more than 10%). Elastomeric tooling without a rigid body can typically produce thermoplastic parts with micro-features that vary by less than 1% from part to part, but typically produce macro-features that vary by at least 5%. The hybrid tooling described herein has been demonstrated in some aspects to produce thermoplastic parts with macro-features that vary less than 0.1% and micro-features that vary by less than 1%.

The rigid tool bodies can provide for reproducible macro-scale dimensions in the thermoplastic component when formed. One problem associated with soft tool embossing is that the components produced can have large-scale structural deviations and macro-scale dimensions that are not reproducible reliably without unwanted variations. For example, in some aspects the methods provided herein are capable of producing thermoplastic components with a dimensional tolerance of about 5%, about 1%, about 0.1%, or less.

The cavity forming surfaces of the top and bottom tools are formed from a thin elastomer layer coating at least a portion of the cavity-forming sides of the tools. The cavity forming surfaces can include a feature forming surface for forming the precision micro-scale features in the thermoplastic component. The elastomer layers allow for the formation of the small micro-scale features, even for very small features sizes with high aspect ratios, and for the micro-scale features to be more readily released from the mold after formation.

Figure 1E:
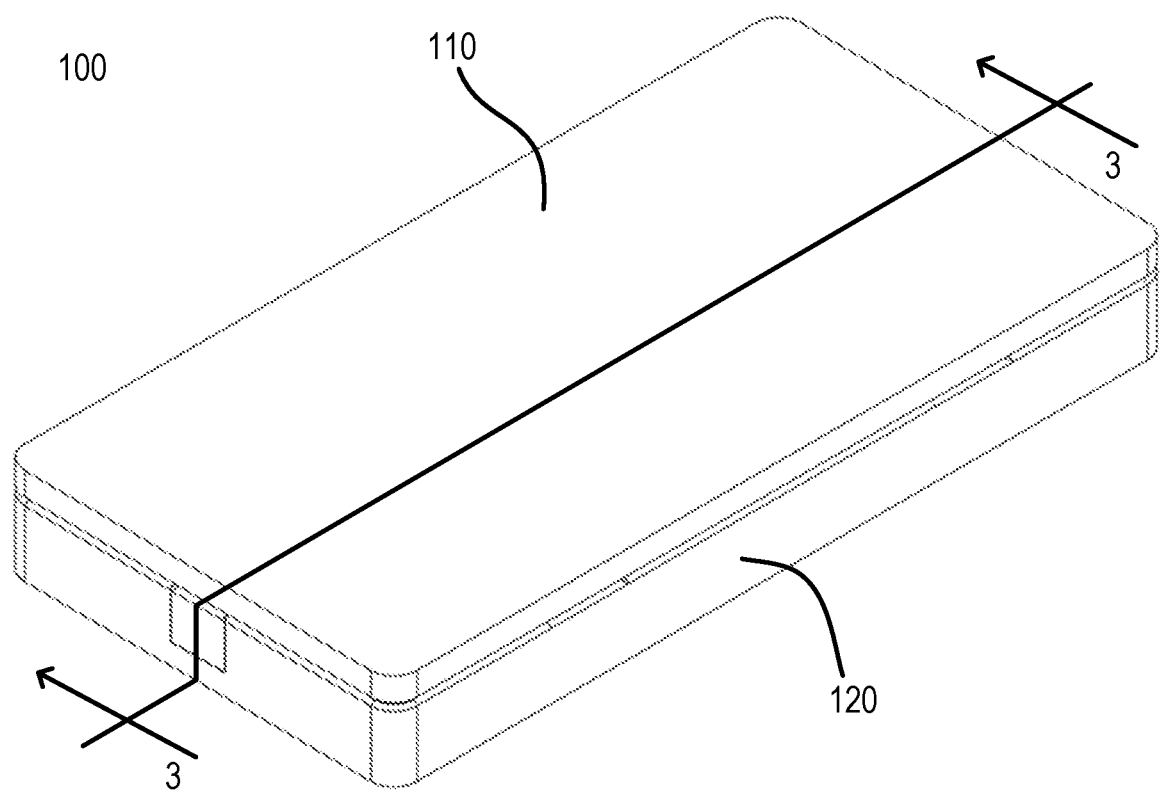
Figure 1F:
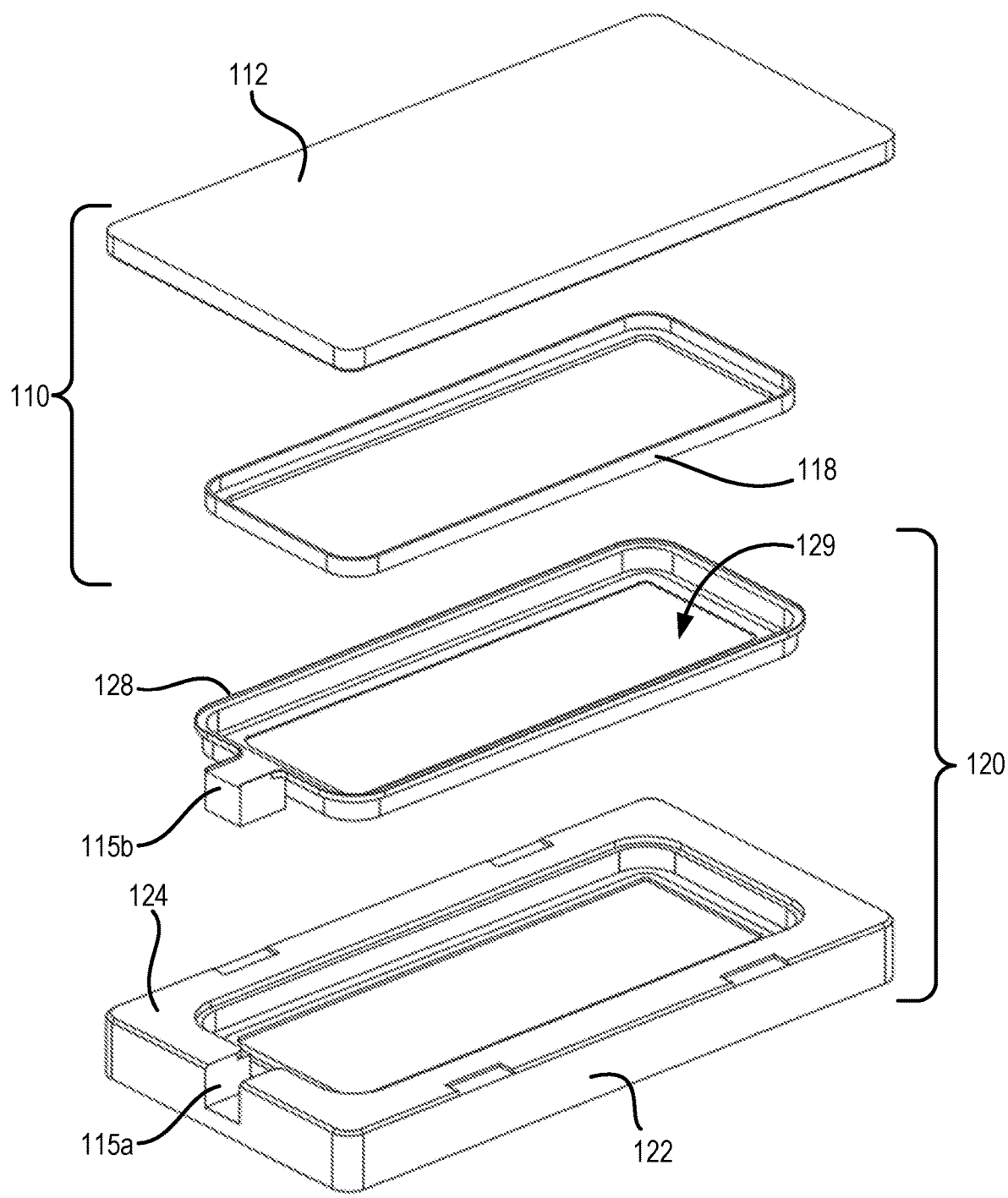
Figure 1G:
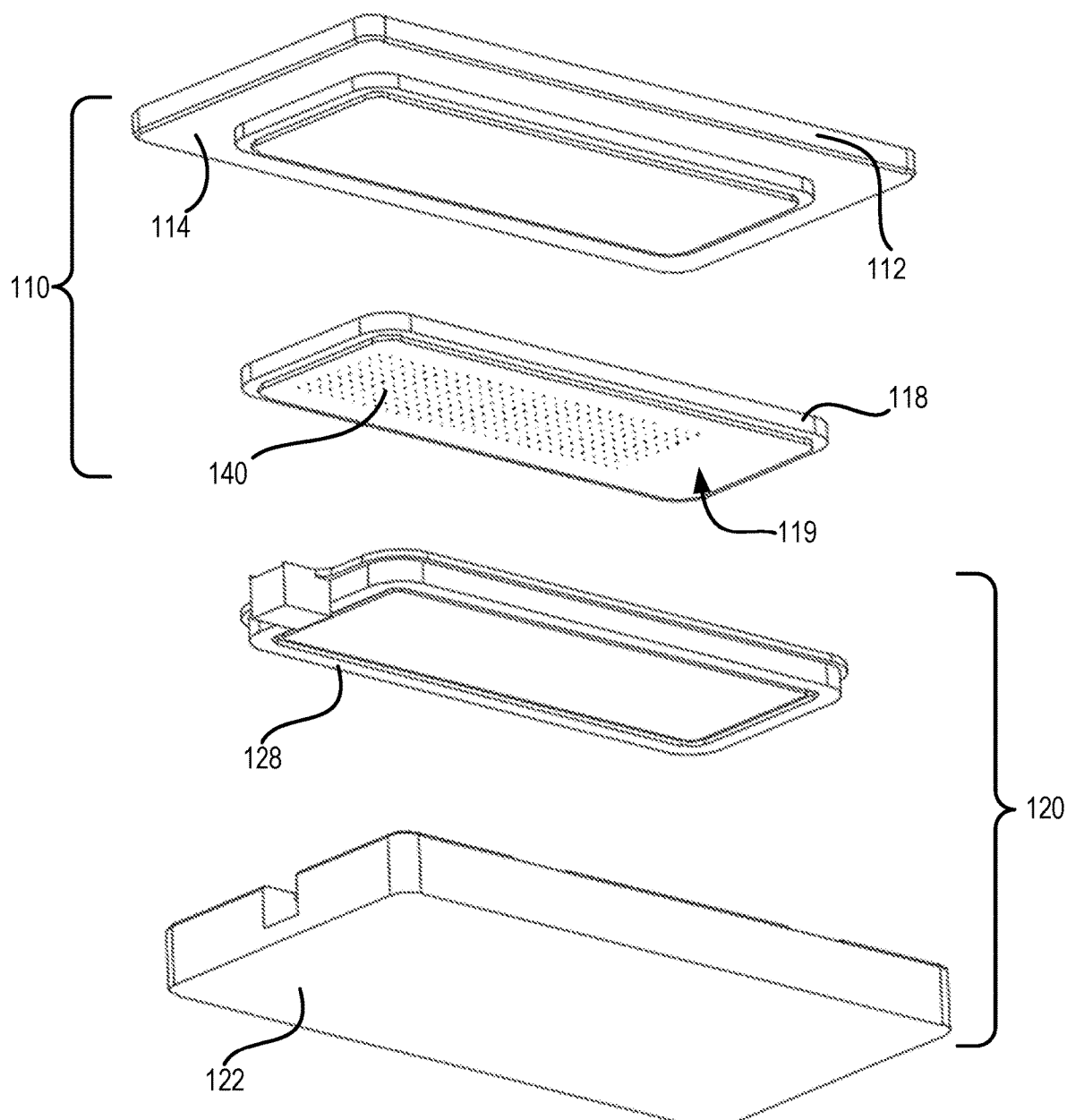
Figure 1H:
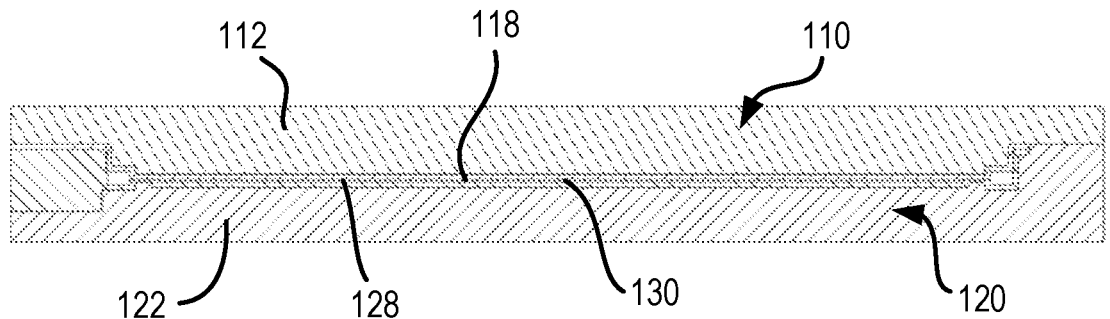
Figure 4:
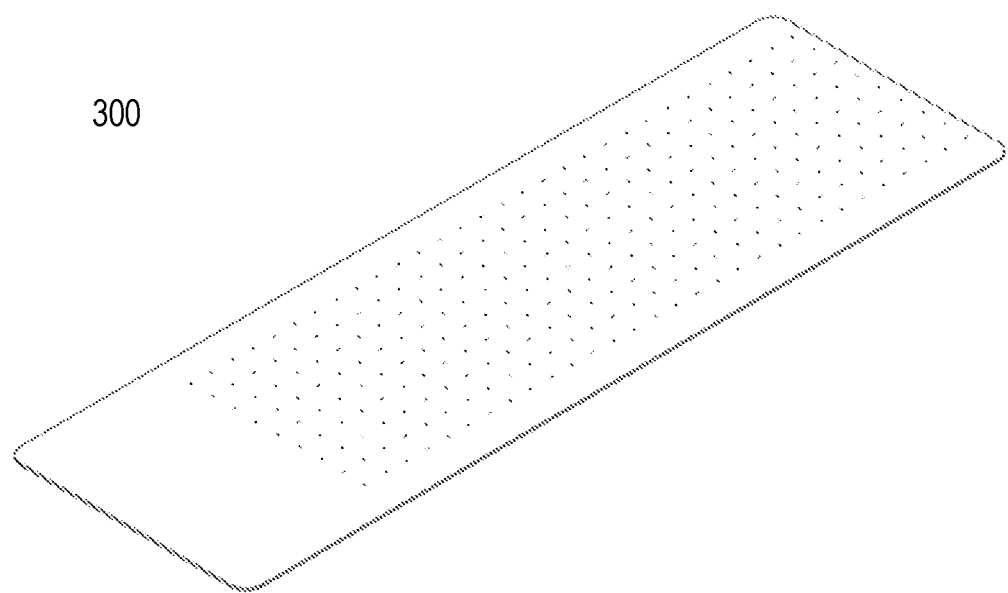
FIG. 4 is a perspective view of an exemplary embossed part that can be produced, for example, using the first exemplary thermoplastic forming assemblage according to FIGS. 1A-1H and starting from an exemplary embossing blank according to FIG. 2.

To illustrate some of the features of the thermoplastic forming assemblages according to certain aspects of the disclosure, a first exemplary thermoplastic forming assemblage 100 is depicted in FIGS. 1A-1H. The first exemplary thermoplastic forming assemblage 100 includes a top tool 110 and a bottom tool 120. The top tool 110 has a first rigid tool body 112 having a first cavity-forming side 114 with a protrusion 116. The top tool 110 also has a first elastomer layer 118 conformally coating at least the protrusion 116 to create a first cavity-forming surface 119. The bottom tool 120 has a second rigid tool body 122 having a second cavity-forming side 124 with a recess 126. The recess 126 is configured to receive the protrusion 116 of the top tool 110 when in a closed position (FIG. 1E, FIG. 1H). The bottom tool 120 also has a second elastomer layer 128 conformally coating at least the recess 126 to create a second cavity-forming surface 129. When the top tool 110 and the bottom tool 120 are in the closed position, the first cavity-forming surface 119 and the second cavity-forming surface 129 define a cavity 130 for forming a thermoplastic component such as the one depicted in FIG. 4.

In some aspects, the thermoplastic forming assemblages can include a plurality of cavities for forming a plurality of thermoplastic components, e.g. for forming multiple thermoplastic components at about the same time. For example, the assemblage can include a single bottom tool having a plurality of recessed that are arranged and dimensioned to receive one of a plurality of protrusions to form a plurality of cavities for forming the thermoplastic components. For example, tools having 2, 3, 4, 8, or more cavities for forming thermoplastic components are envisioned. The top tool and/or the bottom tool can be a multi-part tool, e.g. the assemblage can include a single bottom tool and a plurality of top tools wherein each can be individually removed and can be individually in a closed position to form a cavity.

Figure 5A:
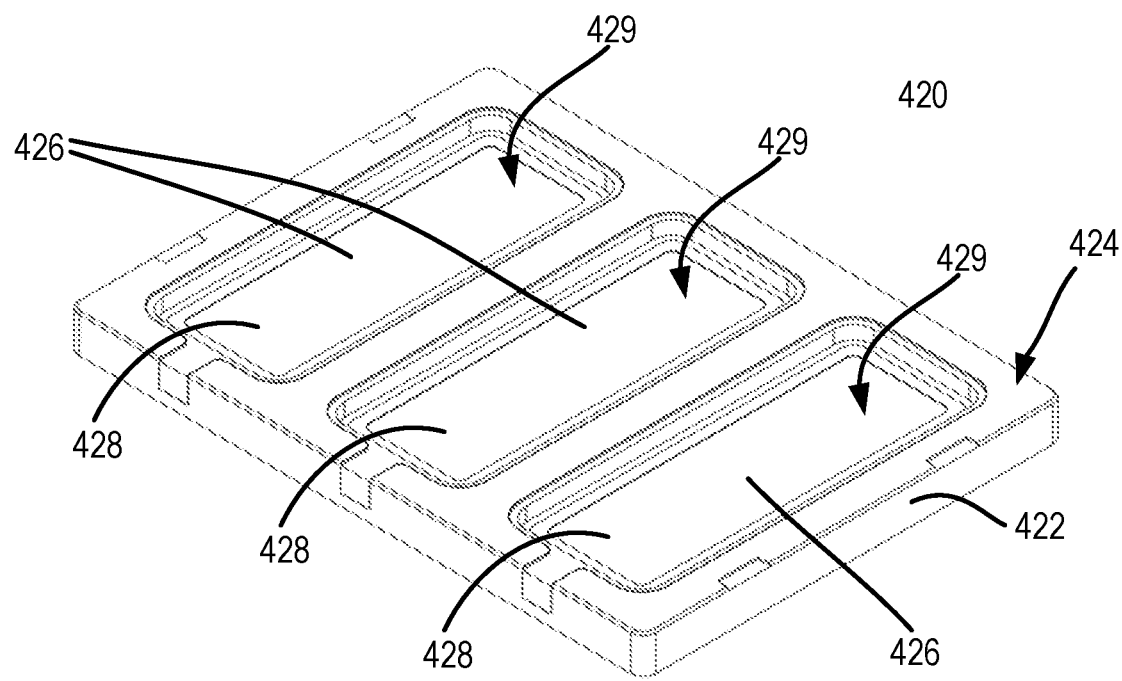
FIGS. 5A-5E are various views of a second exemplary thermoplastic forming assemblage having three cavities for forming three thermoplastic components according to the various aspects of the disclosure.
Figure 5B:
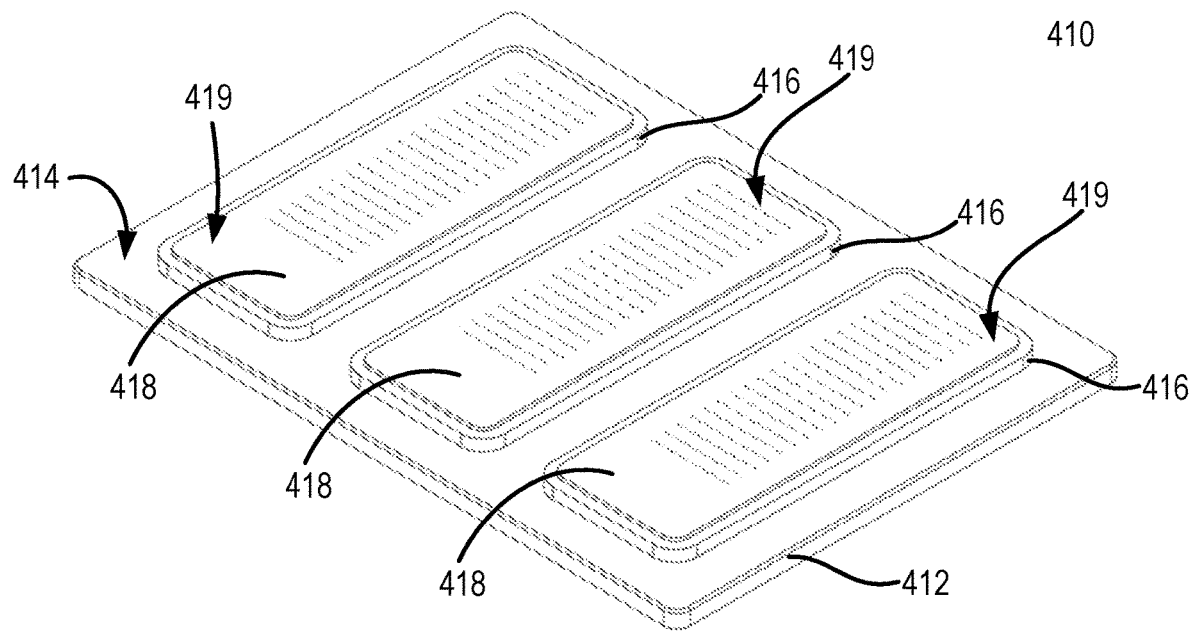
Figure 5C:
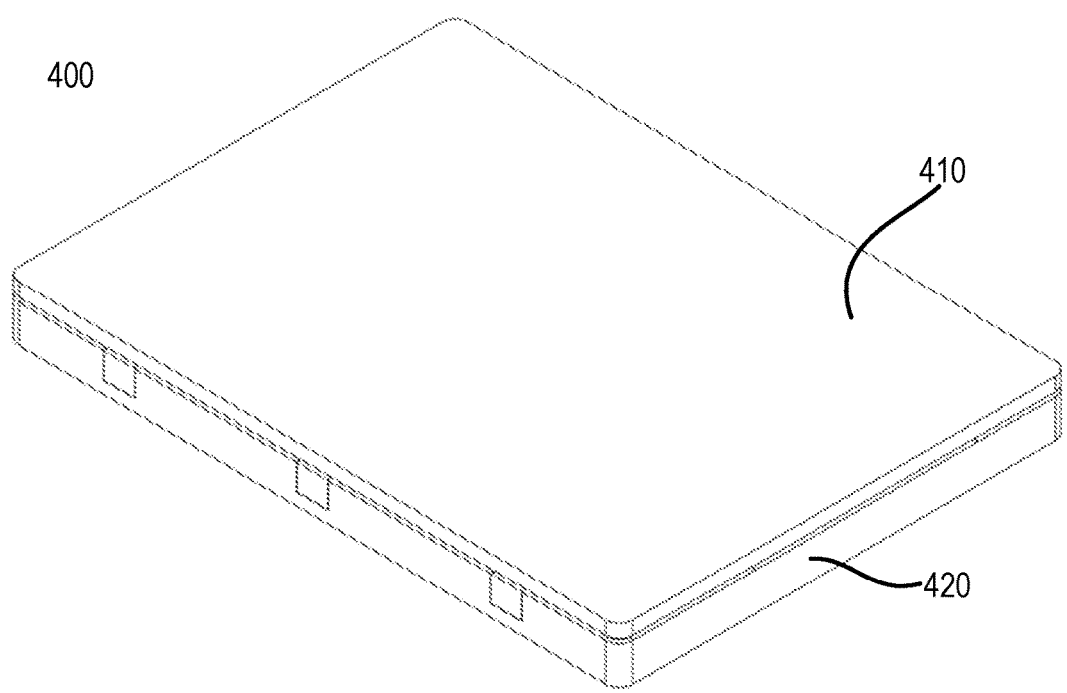
Figure 5D:
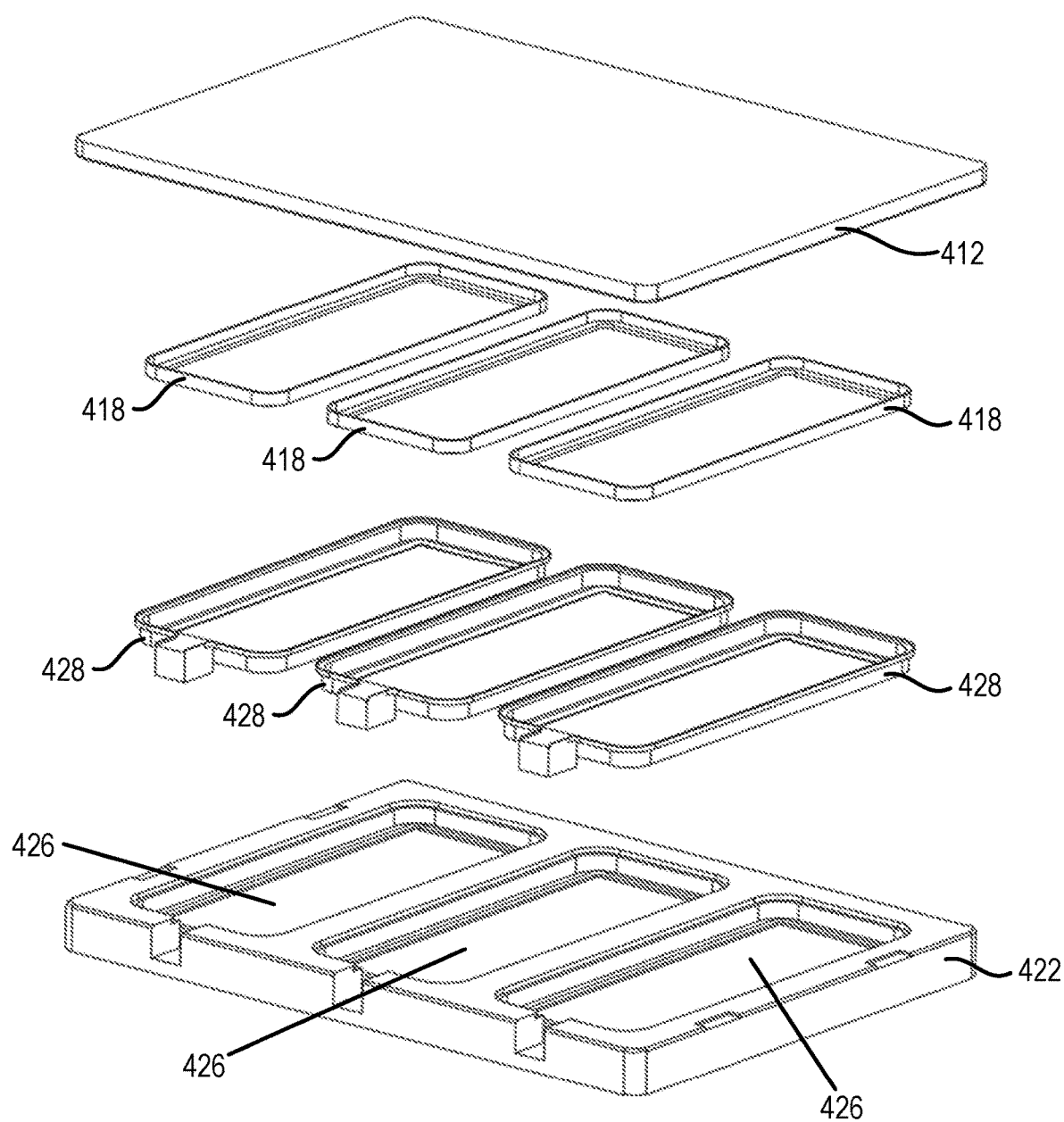
Figure 5E:
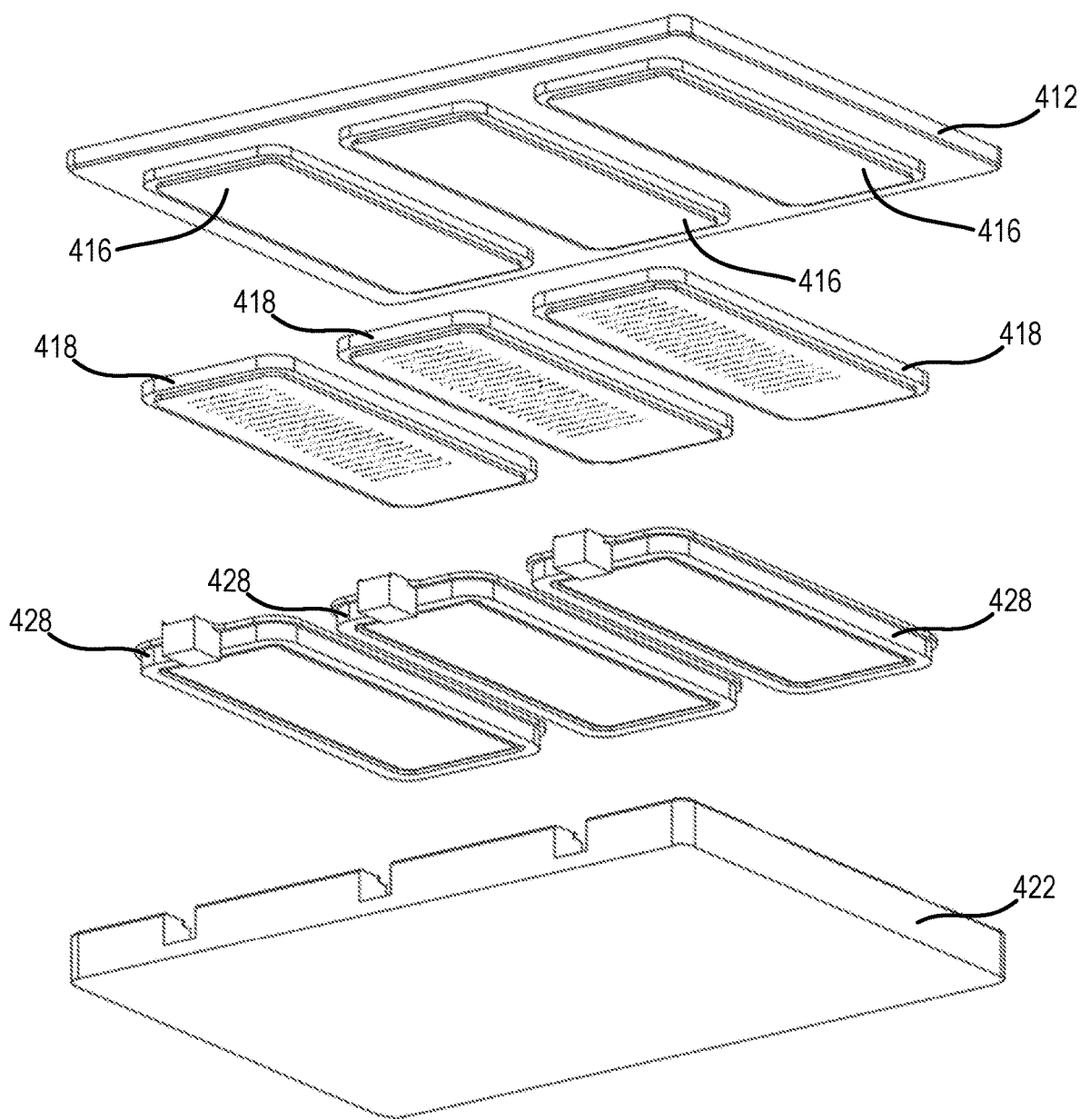

As one example of an assemblage having a single top tool and a single bottom tool, a second exemplary thermoplastic forming assemblage 400 is depicted in FIGS. 5A-5E having the ability to form three thermoplastic components at about the same time. The second exemplary thermoplastic forming assemblage 400 has a top tool 410 has a bottom tool 420. The top tool 410 has a first rigid tool body 412 having a first cavity-forming side 414 with a plurality of (exemplified by three) protrusions 416 which can be identically shaped or different. The top tool 410 also has a first elastomer layer 418 conformally coating at least the plurality of protrusions 416 to create a plurality of first cavity-forming surfaces 419. The bottom tool 420 has a second rigid tool body 422 having a second cavity-forming side 424 with a plurality of (exemplified by three) recesses 426. Each of the recesses 426 is configured and position to receive one of the protrusions 416 of the top tool 410 when in a closed position (FIG. 5C). The bottom tool 420 also has a second elastomer layer 428 conformally coating at least the plurality of recesses 426 to create a plurality of second cavity-forming surfaces 429. When the top tool 410 and the bottom tool 420 are in the closed position, the plurality of first cavity-forming surfaces 419 and second cavity-forming surfaces 429 define a plurality of cavities (not depicted) for forming a plurality of thermoplastic components such as the one depicted in FIG. 4.

Figure 6A:
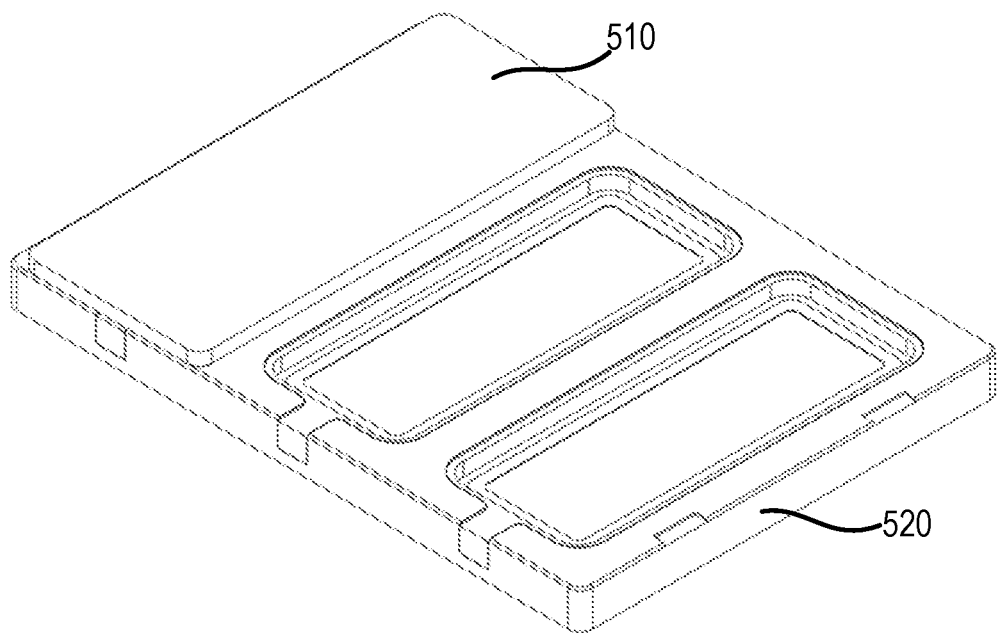
FIGS. 6A-6D are various views of a third exemplary thermoplastic forming assemblage for forming three thermoplastic components using three cavities with three separate top tools according to the various aspects of the disclosure.
Figure 6B:
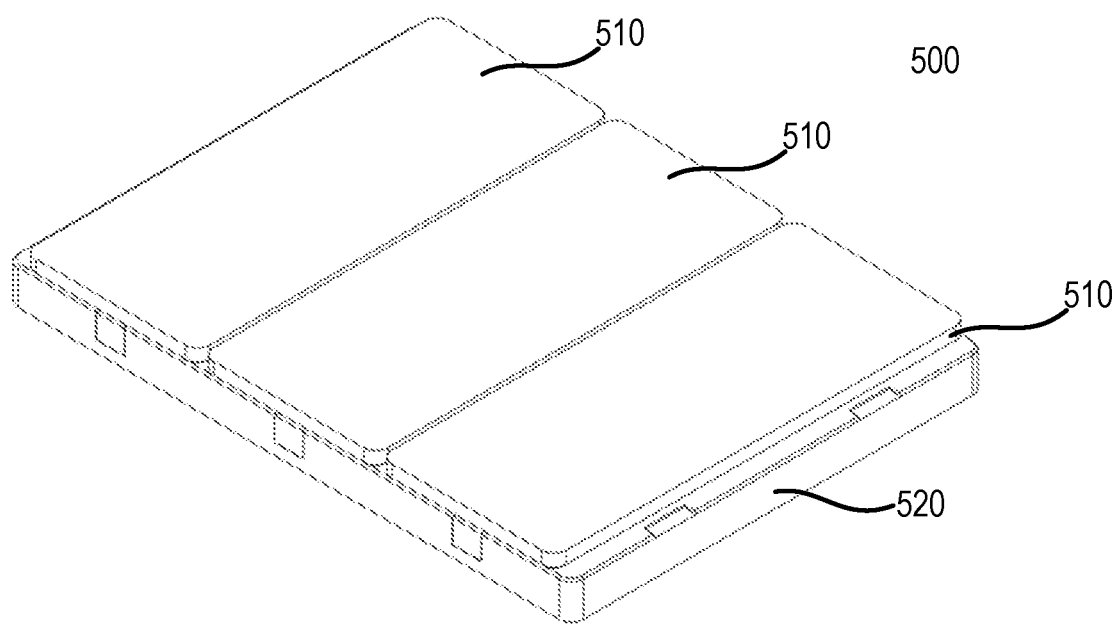
Figure 6C:
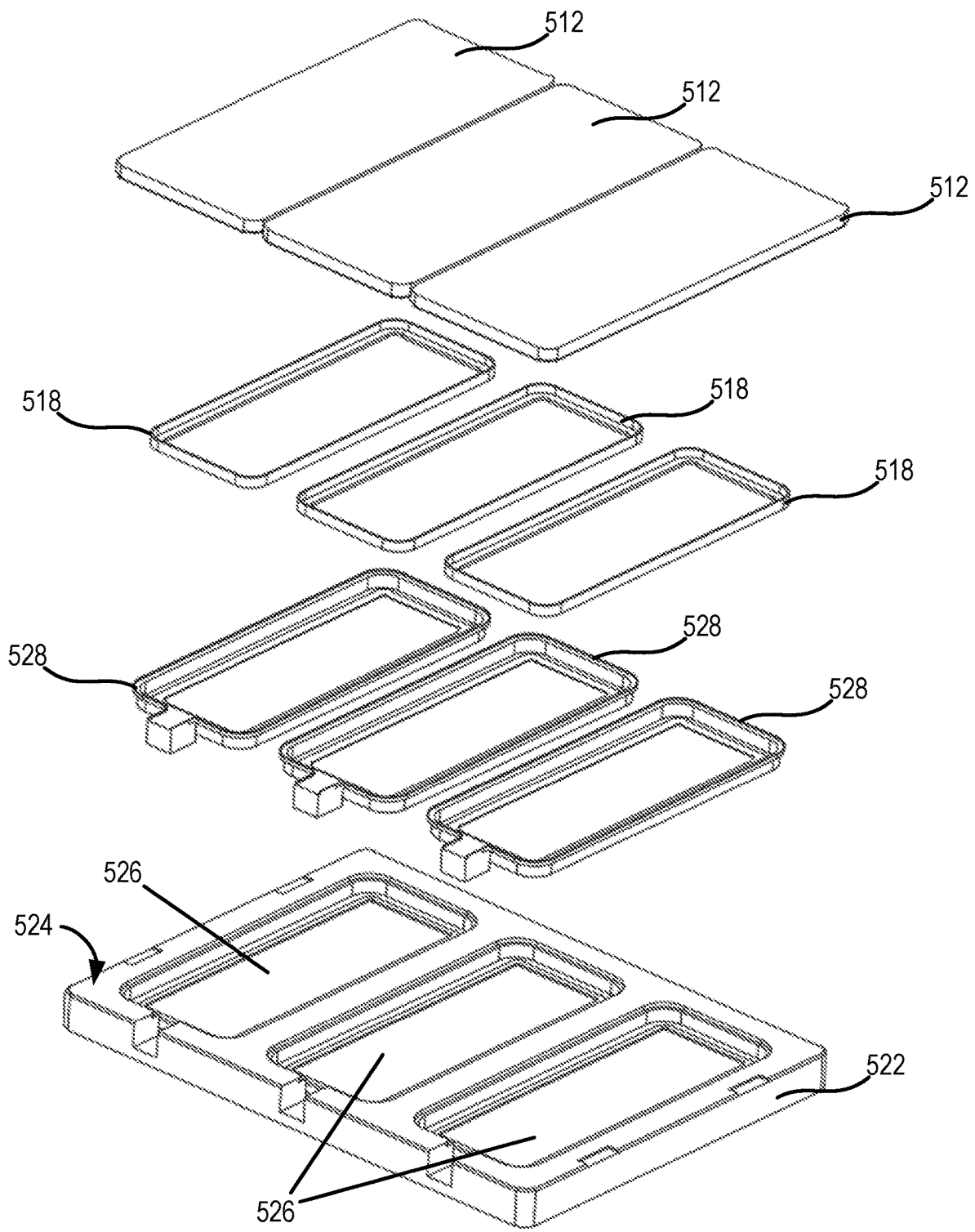
Figure 6D:
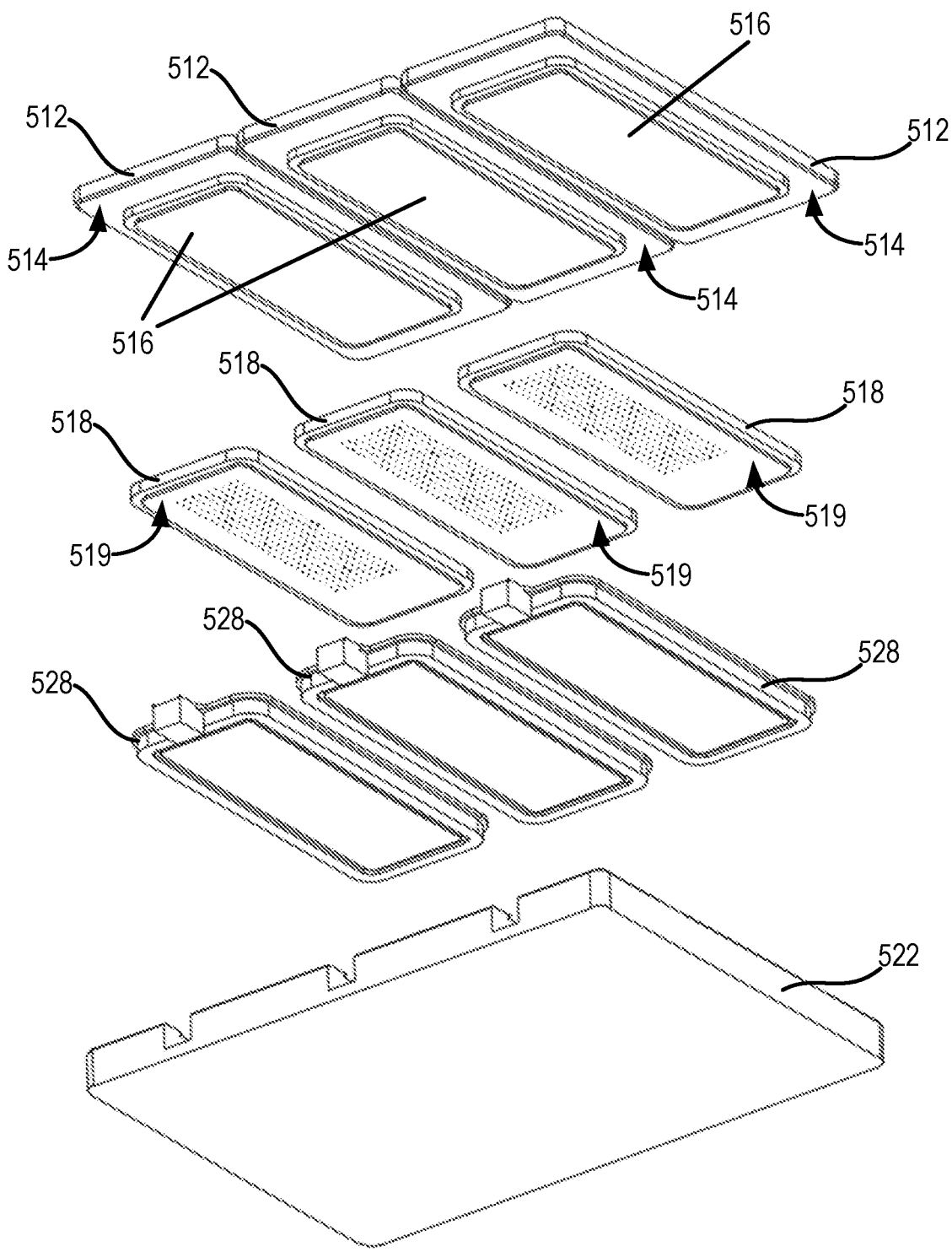

As an example of a tool having a multiple top tools and a single bottom tool, a third exemplary thermoplastic forming assemblage 500 is depicted in FIGS. 6A-6D having the ability to form three thermoplastic components at about the same time. The second exemplary thermoplastic forming assemblage 500 has three top tools 510 and a single bottom tool 520. Each of the top tools 510 has a first rigid tool body 512 having a first cavity-forming side 514 with a single protrusion 516 which can be identically shaped or different. Each of the top tools 510 also has a first elastomer layer 518 conformally coating at least the protrusion 516 to create a first cavity-forming surface 519. The bottom tool 520 has a second rigid tool body 522 having a second cavity-forming side 524 with a plurality of (exemplified by three) recesses 526. Each of the recesses 526 is configured and positioned to receive one of the protrusions 516 of one of the top tools 510 when in a closed position (FIG. 6A-6B). The bottom tool 520 also has a second elastomer layer 528 conformally coating at least the plurality of recesses 526 to create a plurality of second cavity-forming surfaces 529. When each of the top tools 510 and the bottom tool 520 are in the closed position, the plurality of first cavity-forming surfaces 519 and second cavity-forming surfaces 529 define a plurality of cavities (not depicted) for forming a plurality of thermoplastic components such as the one depicted in FIG. 4.

The thermoplastic forming tools and assemblages are capable of producing thermoplastic components with precision micro-scale features. In some aspects, one or both of the first cavity-forming surface and the second cavity-forming surface include a feature-forming surface. A feature-forming surface includes one or a plurality of micro-scale structures for forming features in the final thermoplastic component. For example, where the micro-scale features are to be wells, the feature-forming surface can include a plurality of pillars that create a well in the thermoplastic component. The feature-forming surface can include wells, pillars, dimples, pores, channels, ridges, more complex geometric structures, or any combination thereof. Returning to the first exemplary thermoplastic forming assemblage 100, a feature-forming surface 140 can be seen in a portion of the first cavity-forming surface 119 of the top tool 110. In this example, the feature-forming surface 140 includes an array of micro-scale pillar features 141 in a regular pattern or array. The pillar features 141 will therefore produce an array of precision micro-scale wells in a thermoplastic component when produced using the first exemplary thermoplastic forming assemblage 100.

The thermoplastic forming tools and assemblages can include features for molding recesses and holes into the embossed substrate including, single stage or multistage thru-holes and blind holes. These molding features can take the form of protrusions on either side of the tool, or a separate insert (e.g. a core-pin) that intersects the cavity. The protrusions or inserts can 1) partly protrude into the mold cavity, 2) abut a flat surface on the opposite side of the tool, or 3) fit into a recess on the opposite side of the tool, or 4) some combination thereof. These protrusion or inserts can be part of the elastomeric layer, part of the rigid layer, or both (i.e. a rigid core with elastomeric skin). Inserts can also be spring-mounted such that the pin retracts when compressed against the rigid blank at room temperature, but penetrates the cavity once the polymer is heated and begins to flow.

Figure 7A:
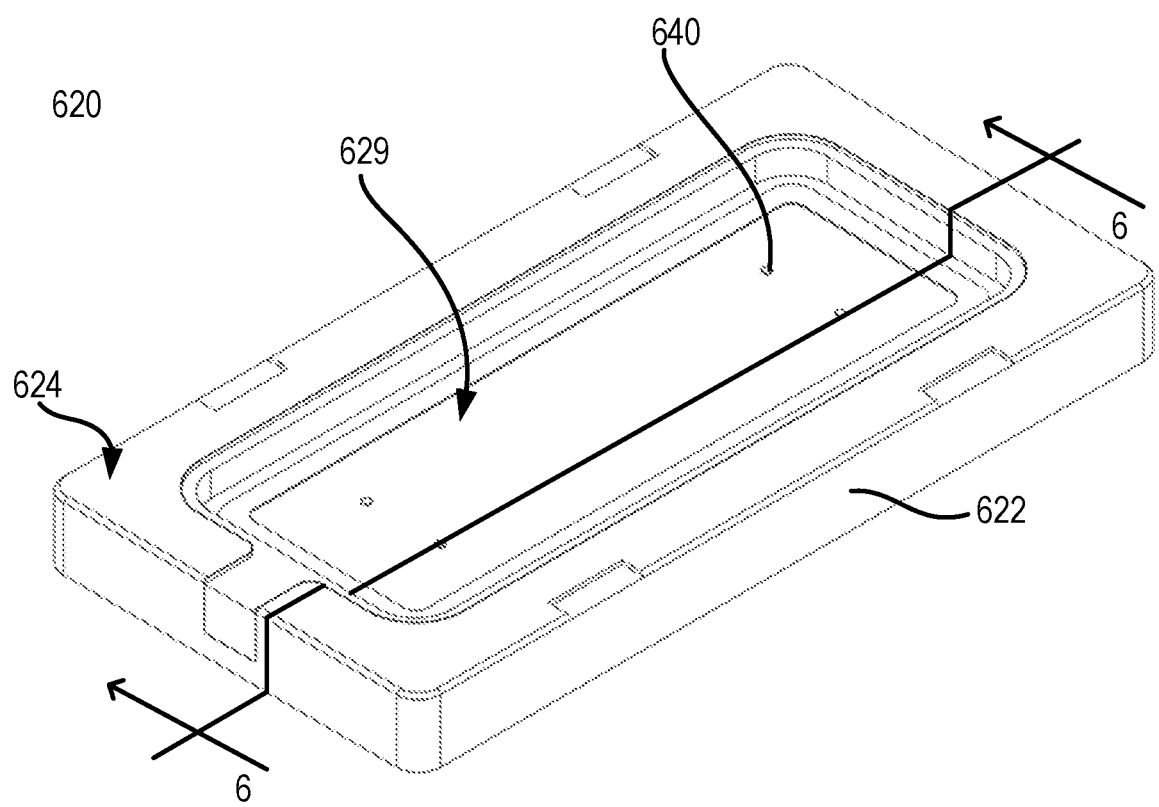
FIGS. 7A-7C depict various views of a fourth exemplary thermoplastic forming assemblage having one or more through-hole forming features.
Figure 7B:
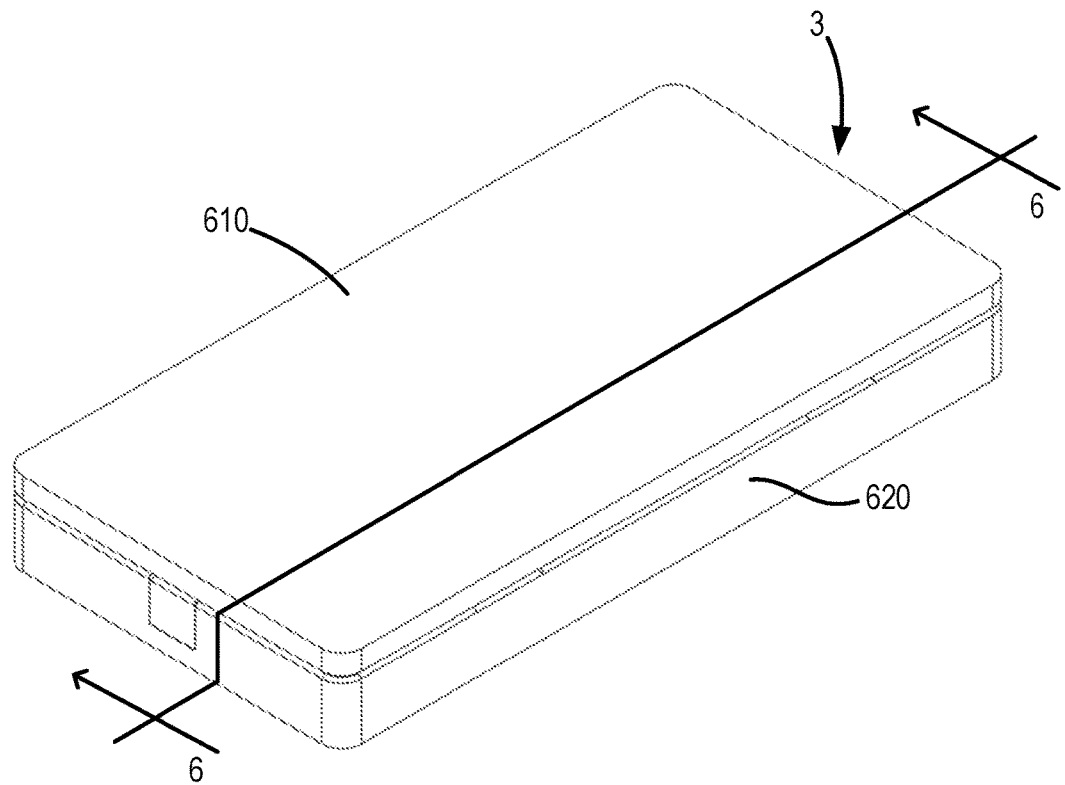
Figure 7C:
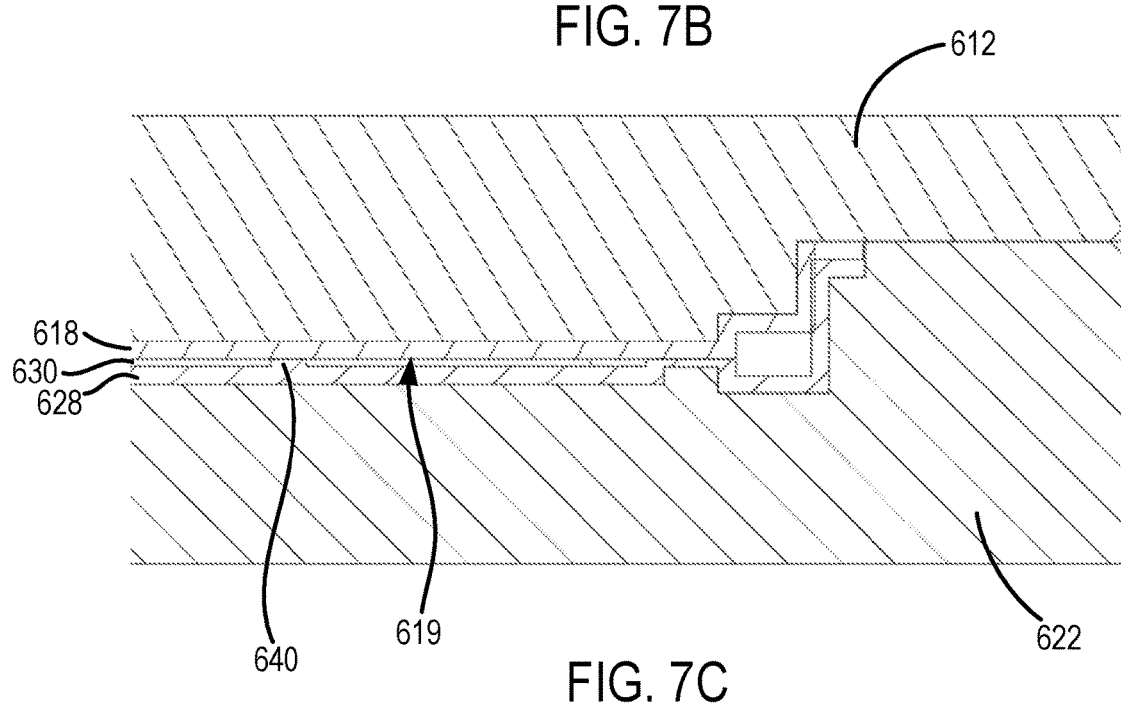
Figure 8A:
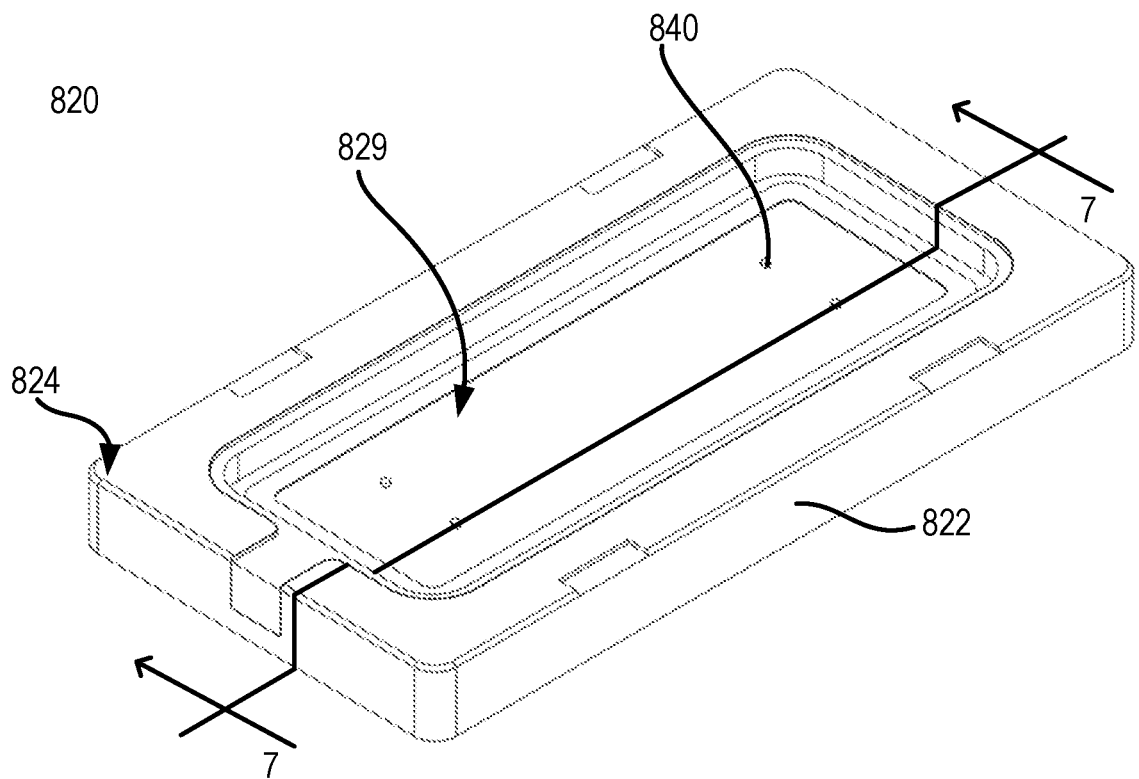
FIGS. 8A-8E depict various views of a fifth exemplary thermoplastic forming assemblage having one or more through-hole forming features.
Figure 8B:
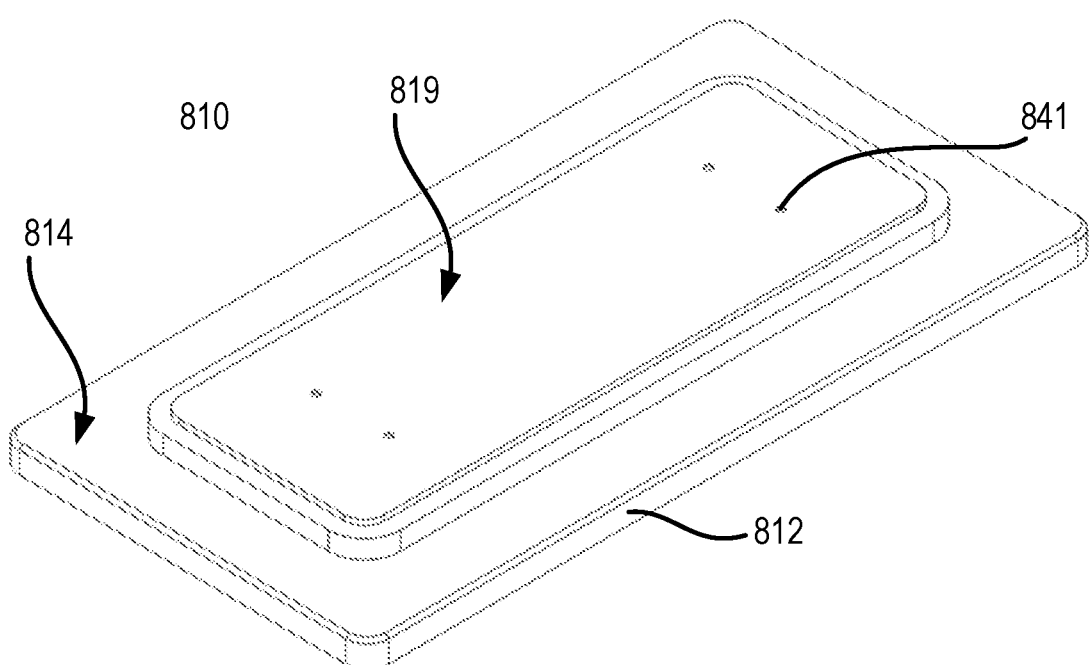
Figure 8C:
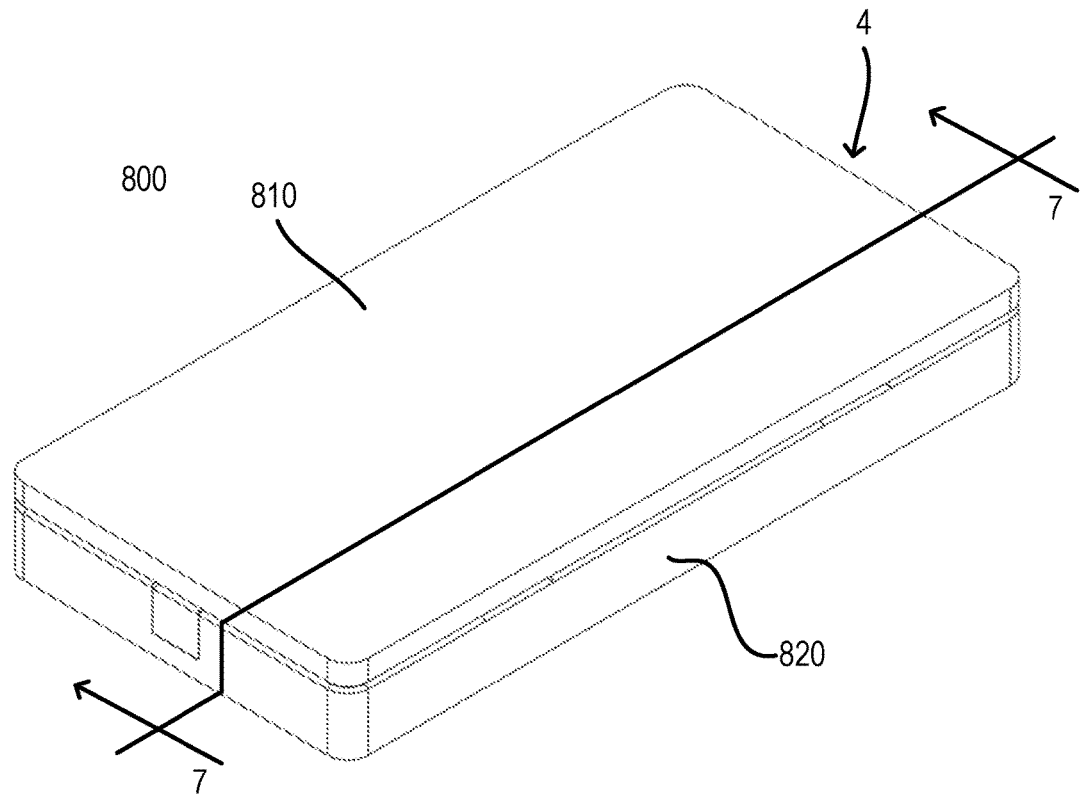
Figure 8D:
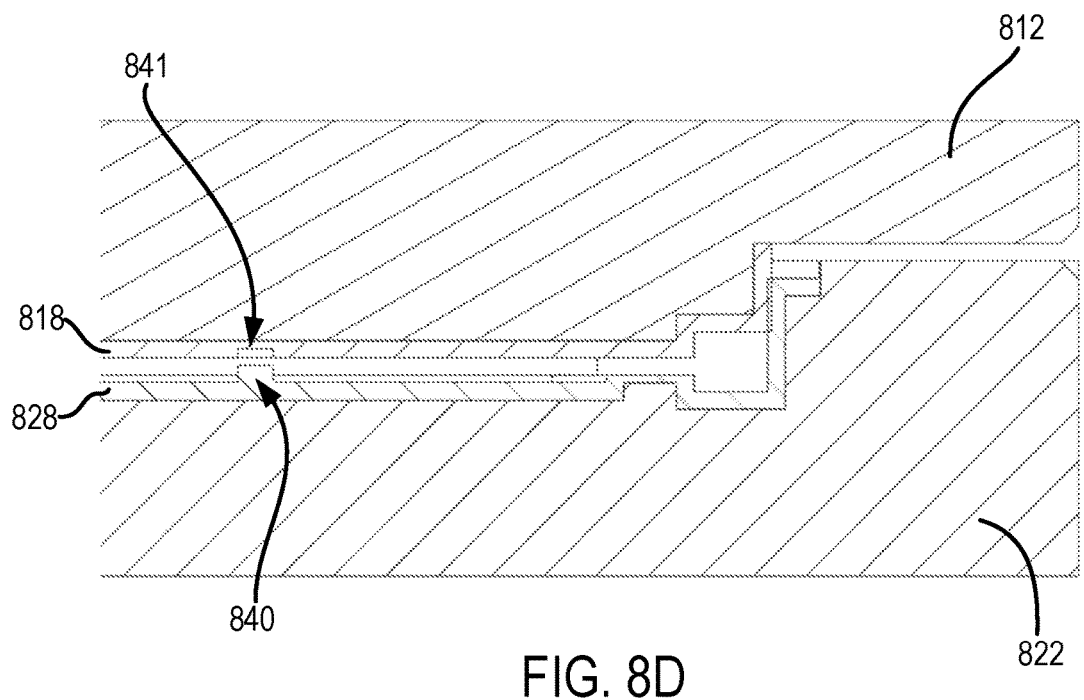
Figure 8E:
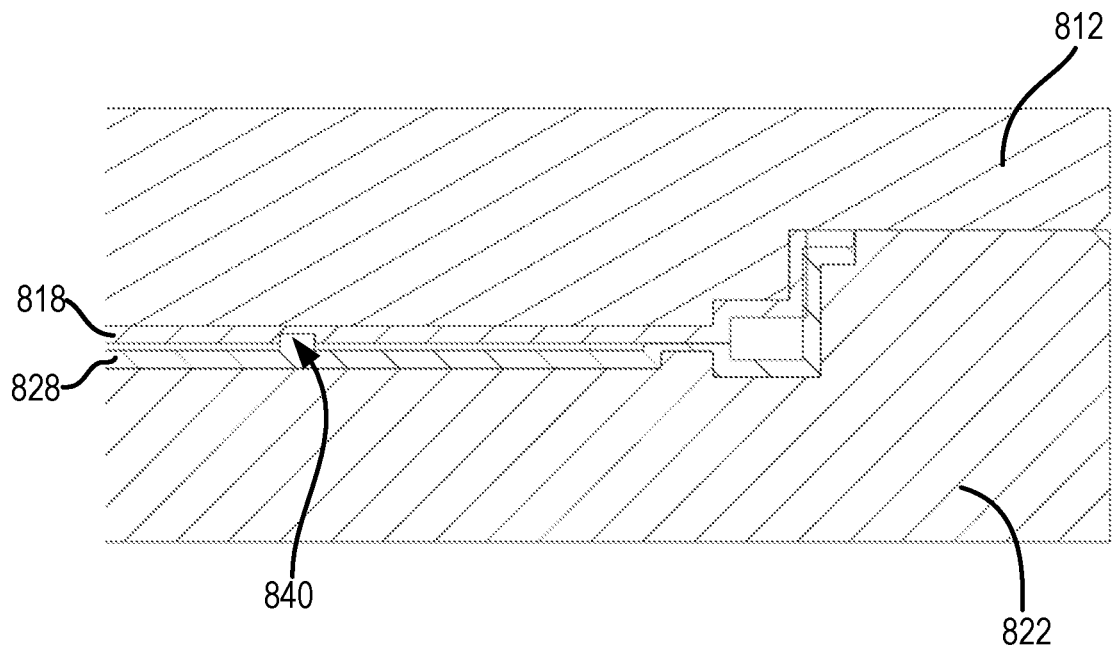

As an example of a tool having through-hole forming features, a fourth exemplary thermoplastic forming assemblage 600 is depicted in FIGS. 7A-7C. The thermoplastic forming assemblage 600 still includes both a top tool 610 and a bottom tool 620, and these are both formed from a rigid tool body (612 and 622 respectively) having the elastomer layer (618 and 628 respectively) conformally coating a portion of the cavity-forming side 624. The elastomer layers (618 and 628 respectively) create the cavity forming surfaces (619 and 629 respectively), except in this exemplary case there are a plurality of through-hole forming features 640 in the cavity forming surface 629 of the bottom tool 620. The through-hole forming feature 640 extends across the cavity 630 to contact the cavity forming surface 619 of the top tool 610.

Of course, the through-hole forming features can extend into the elastomer layer of the opposing tool. As an example, a fifth exemplary thermoplastic forming assemblage 800 is depicted in FIGS. 8A-8E. The fifth exemplary thermoplastic forming assemblage 800 has a top tool 810 and a bottom tool 820. The top tool 810 and bottom tool 820 are both formed from a rigid tool body (812 and 822 respectively) having the elastomer layer (818 and 828 respectively) conformally coating a portion of the cavity-forming side (814 and 824 respectively). The elastomer layers (818 and 828 respectively) create the cavity forming surfaces (819 and 829 respectively). The through-hole forming features 840 in the cavity forming surface 829 of the bottom tool 820 is configured such that, when in a close position, the through-hole forming features 840 extends across the cavity 830 and into a recess 841 in the cavity forming surface 819 of the top tool 810.

The through-hole forming feature can have any cross-sectional shape (e.g. circular, rectangular, etc.) and also can have a varying cross-sectional shape along its length. For example the through-hole forming feature can have a circular cross-section and have a tapered side-wall. Another example of a varying cross-sectional shape is a through-hole forming feature with step-change in diameter along its length. The latter can be used to make a small through hole on one side of a thick embossed part, without requiring a very high aspect ratio through-hole forming feature.

Figure 9:
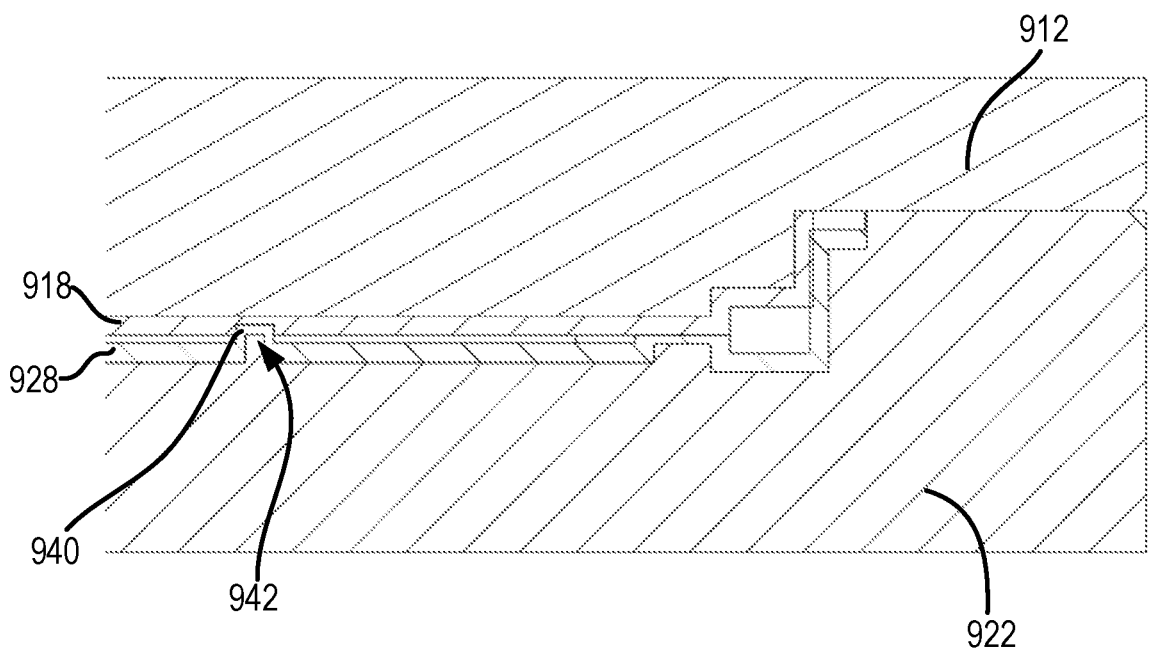
FIG. 9 is a close up of a side section view of a sixth exemplary thermoplastic forming assemblage showing an alternative through-hold forming feature.
Figure 10:
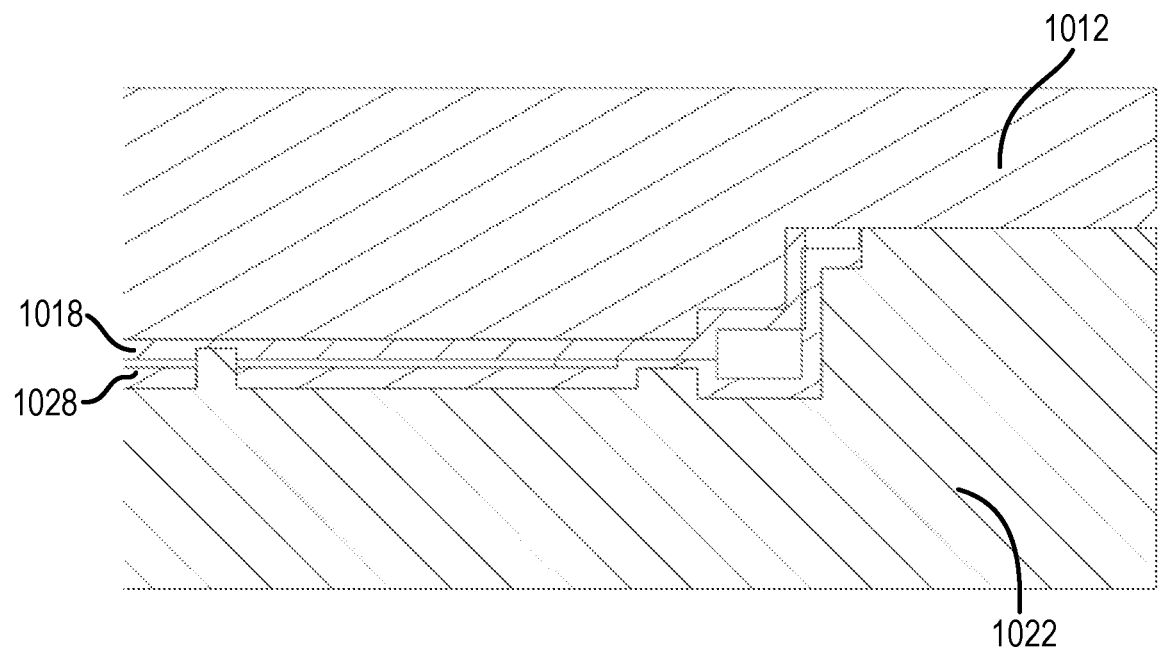
FIG. 10 is a close up of a side section view of a seventh exemplary thermoplastic forming assemblage showing an alternative through-hold forming feature.
Figure 11:
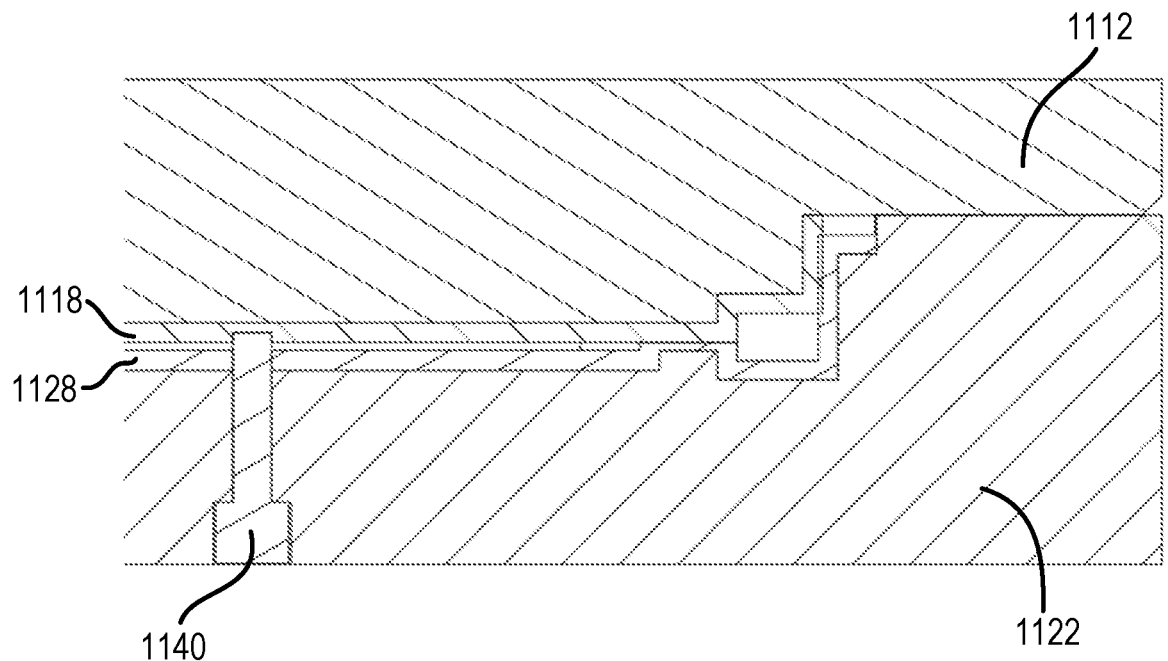
FIG. 11 is a close up of a side section view of an eighth exemplary thermoplastic forming assemblage showing an alternative through-hold forming feature having a core-pin structure.
Figure 12A:
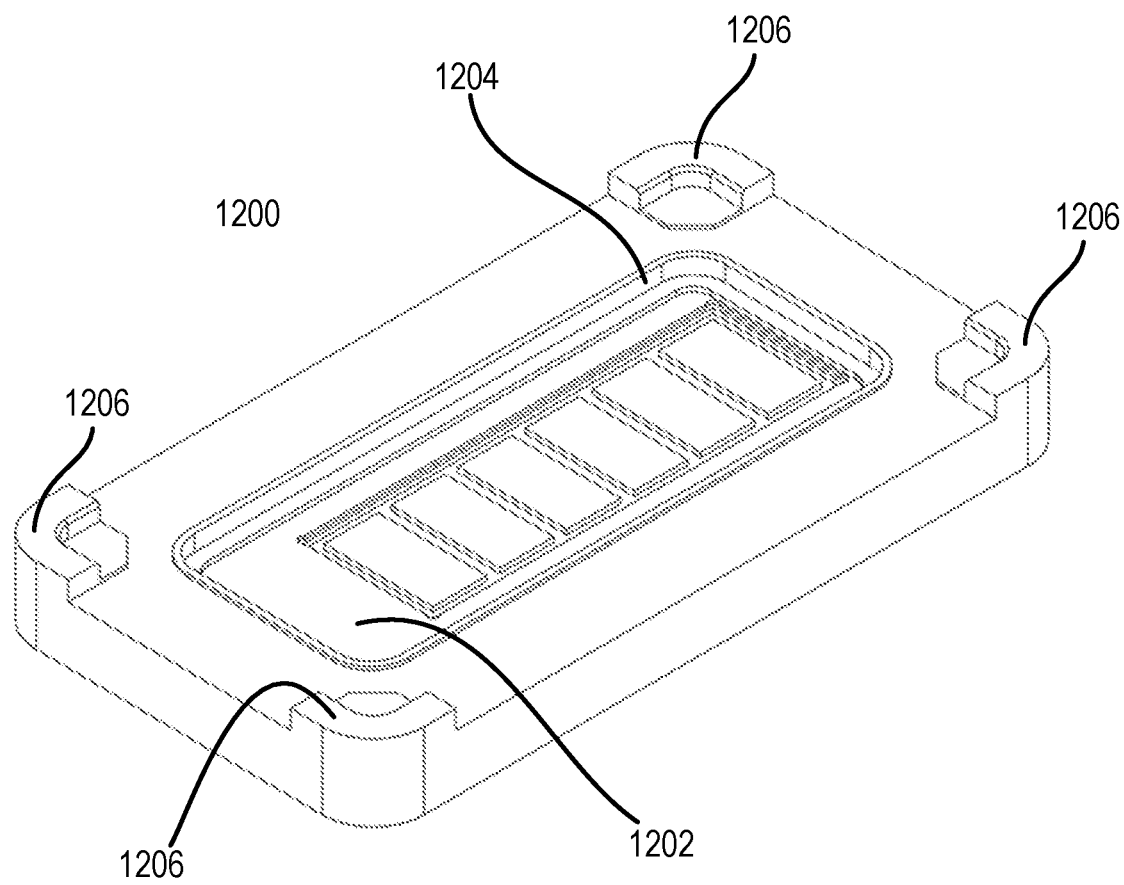
FIGS. 12A-12K depict a first exemplary tool-forming structure for forming a top tool according to the various aspects of the disclosure.
Figure 12B:
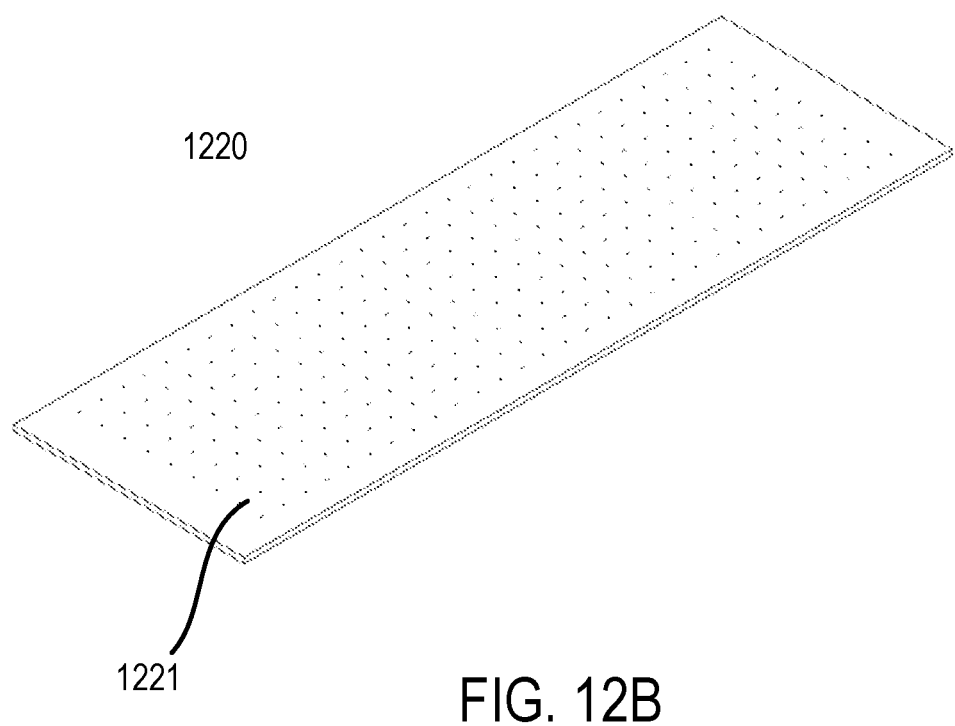
Figure 12C:
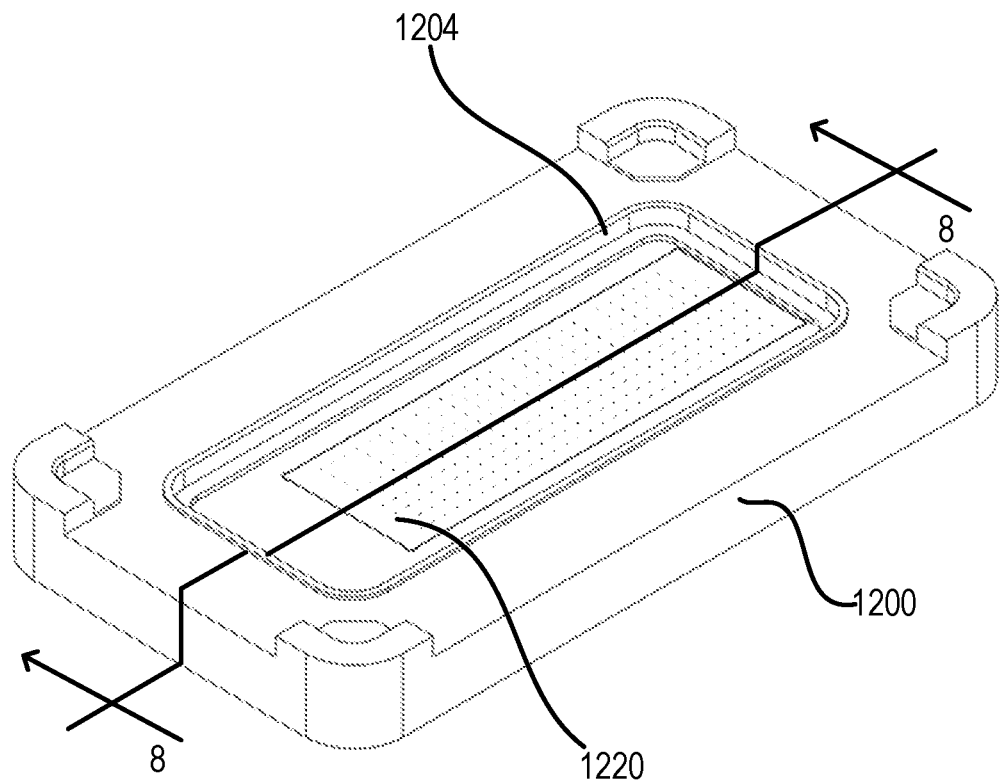
Figure 12D:
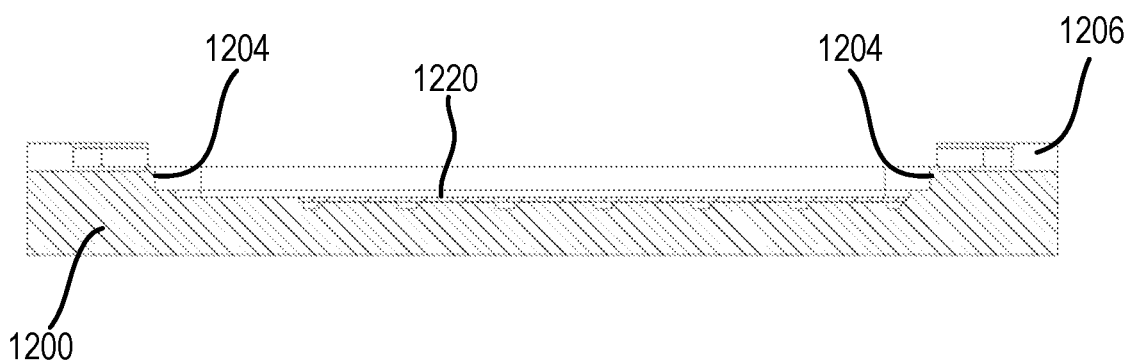
Figure 12E:
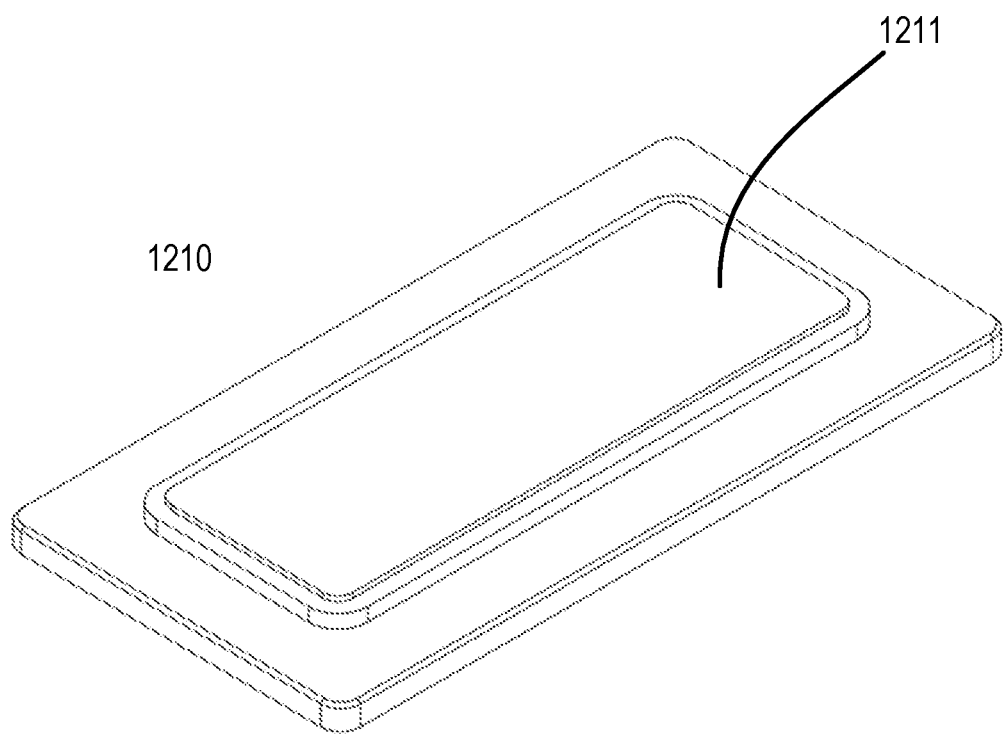
Figure 12F:
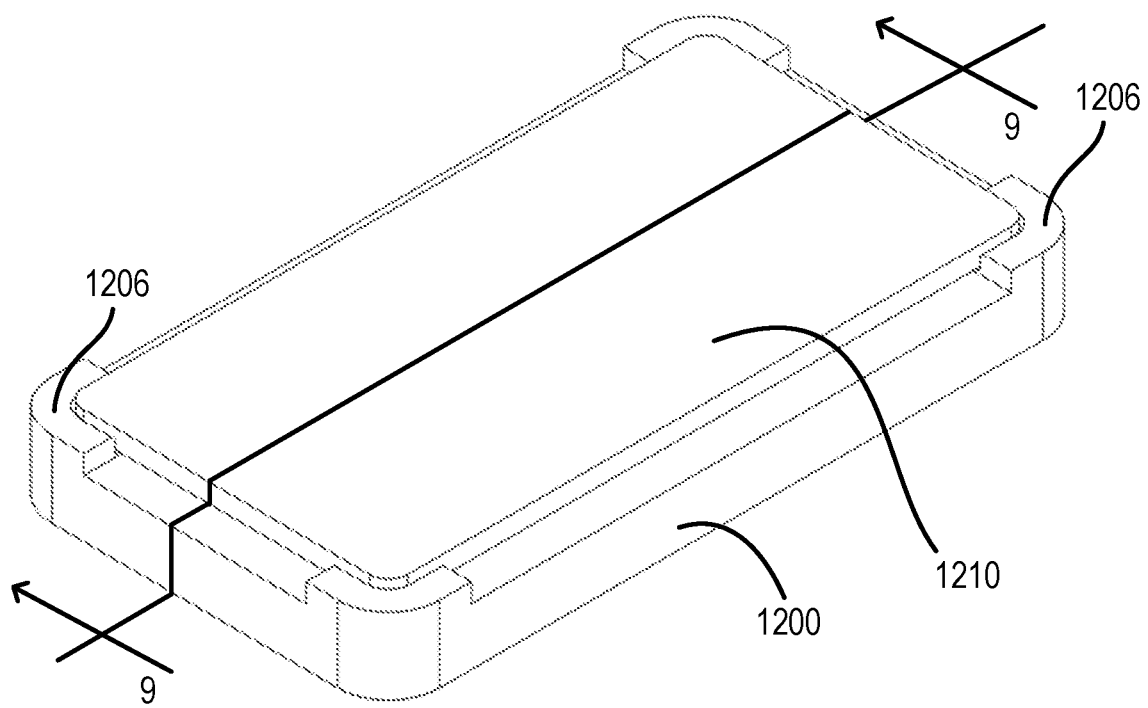
Figure 12G:
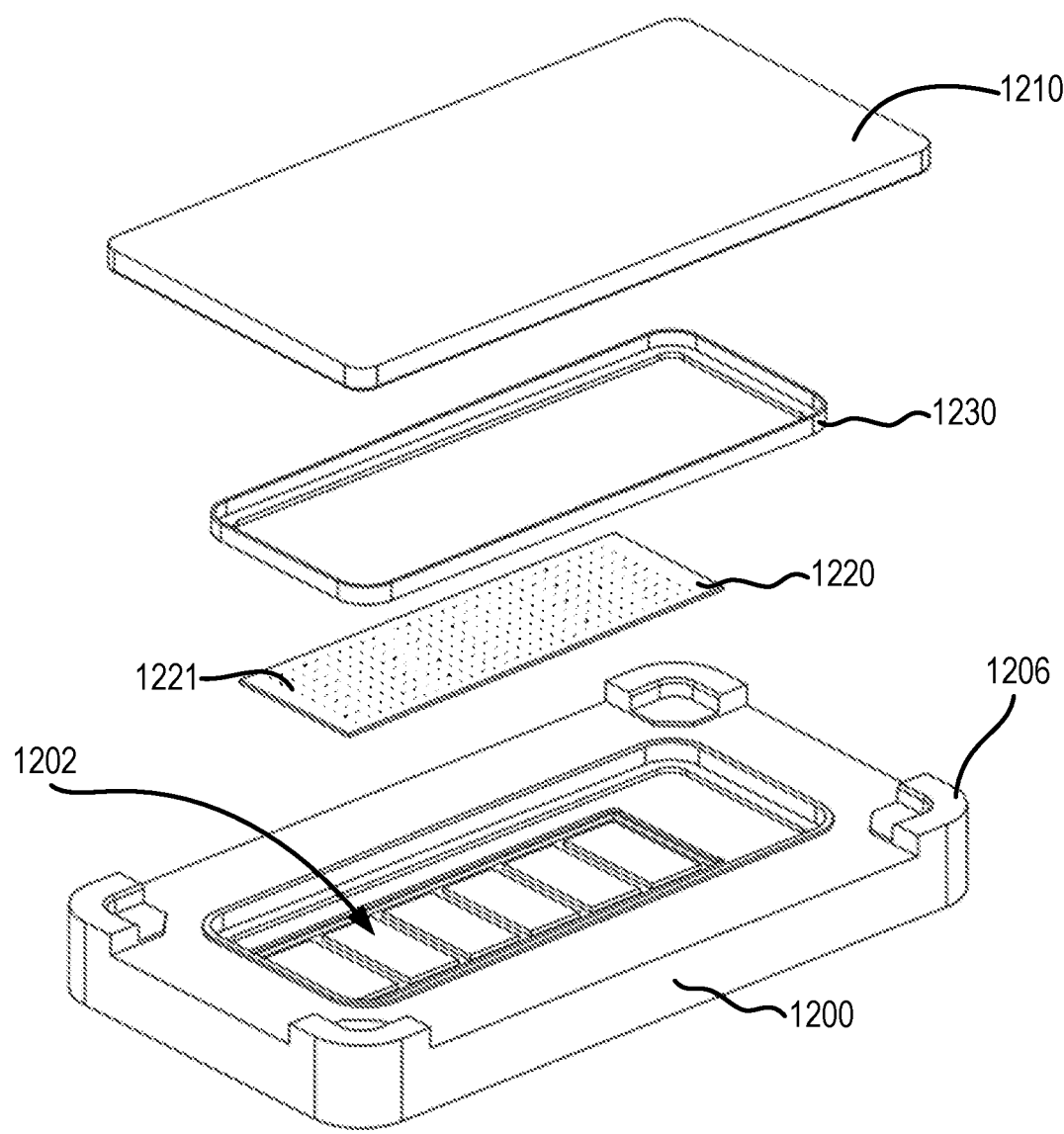
Figure 12H:
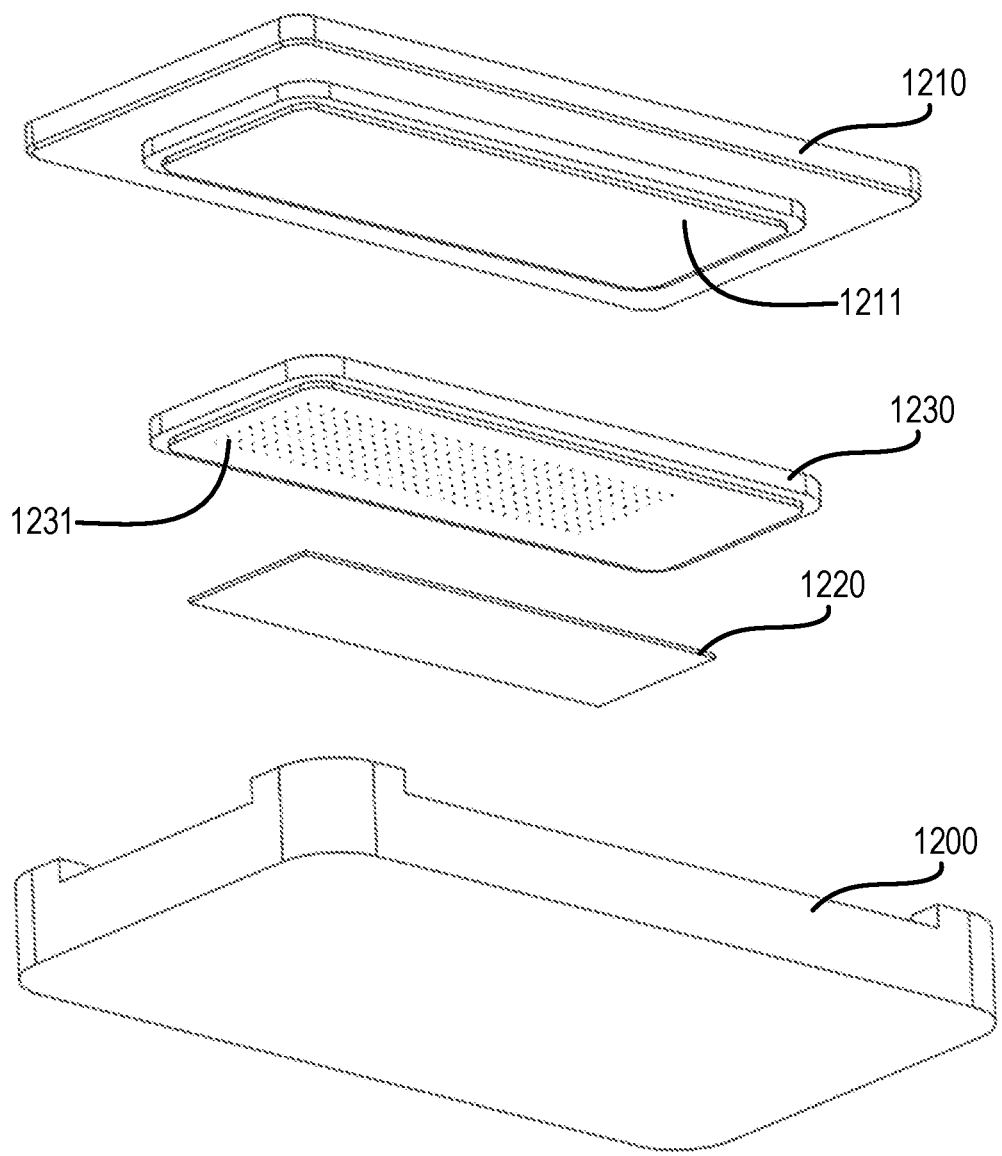
Figure 12I:
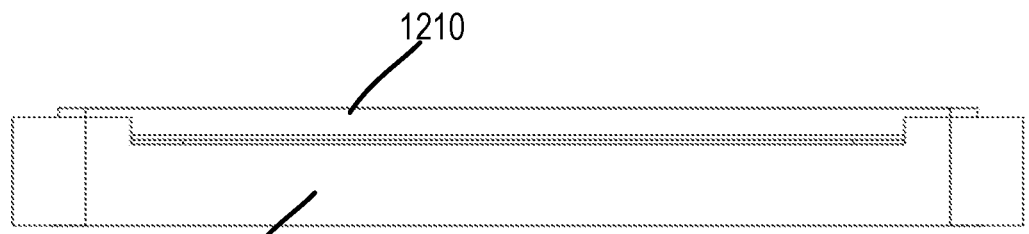
Figure 12J:
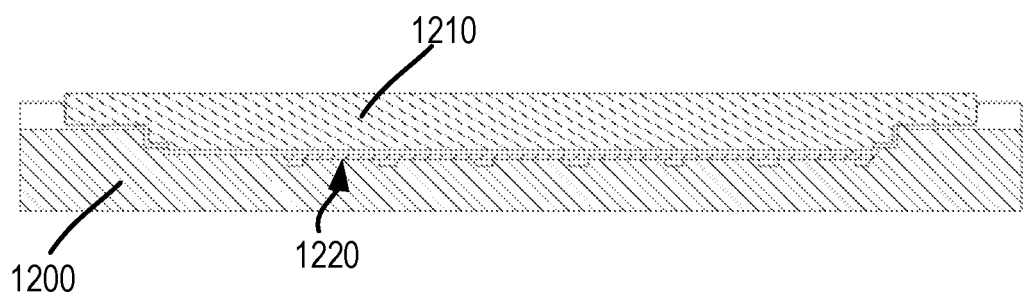
Figure 12K:
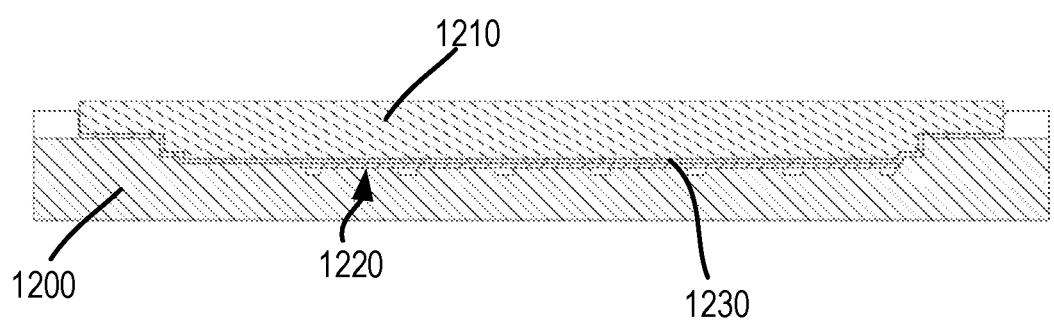
Figure 13A:
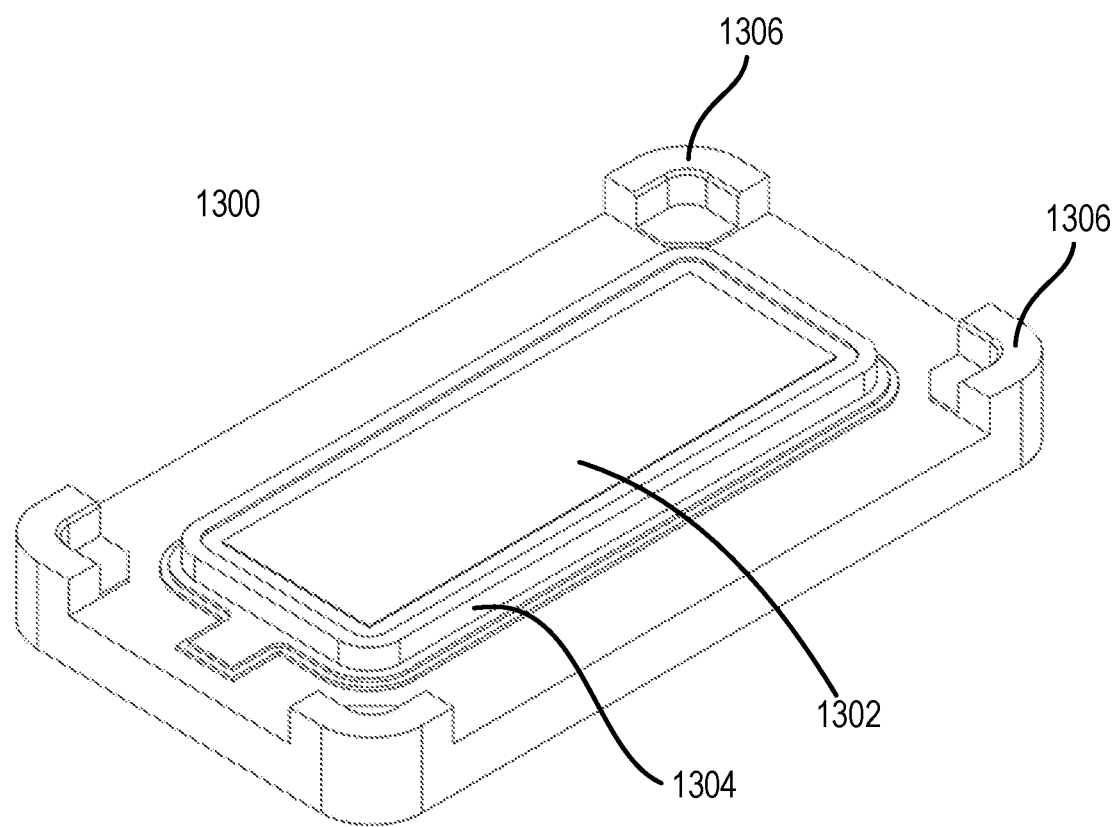
FIGS. 13A-13K depict a second exemplary tool-forming structure for forming a bottom tool according to the various aspects of the disclosure.
Figure 13B:
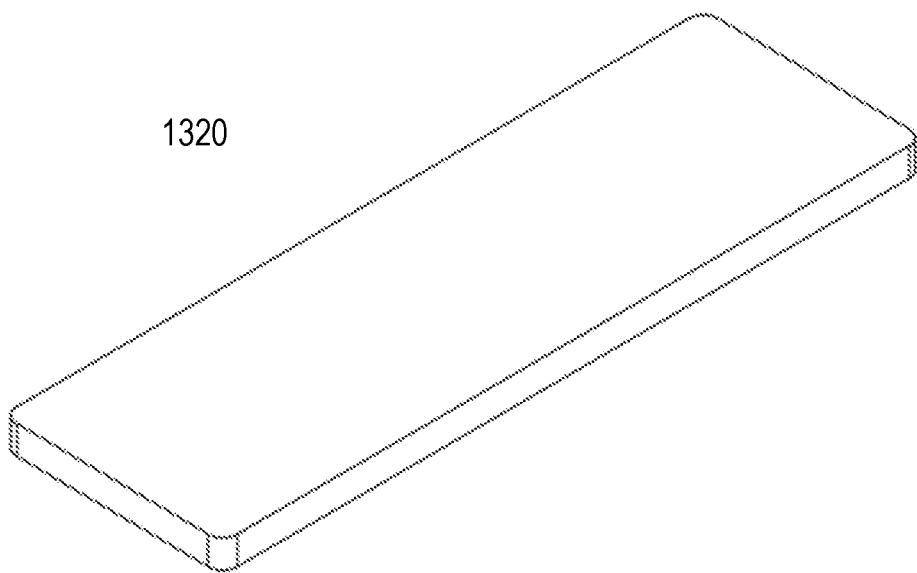
Figure 13C:
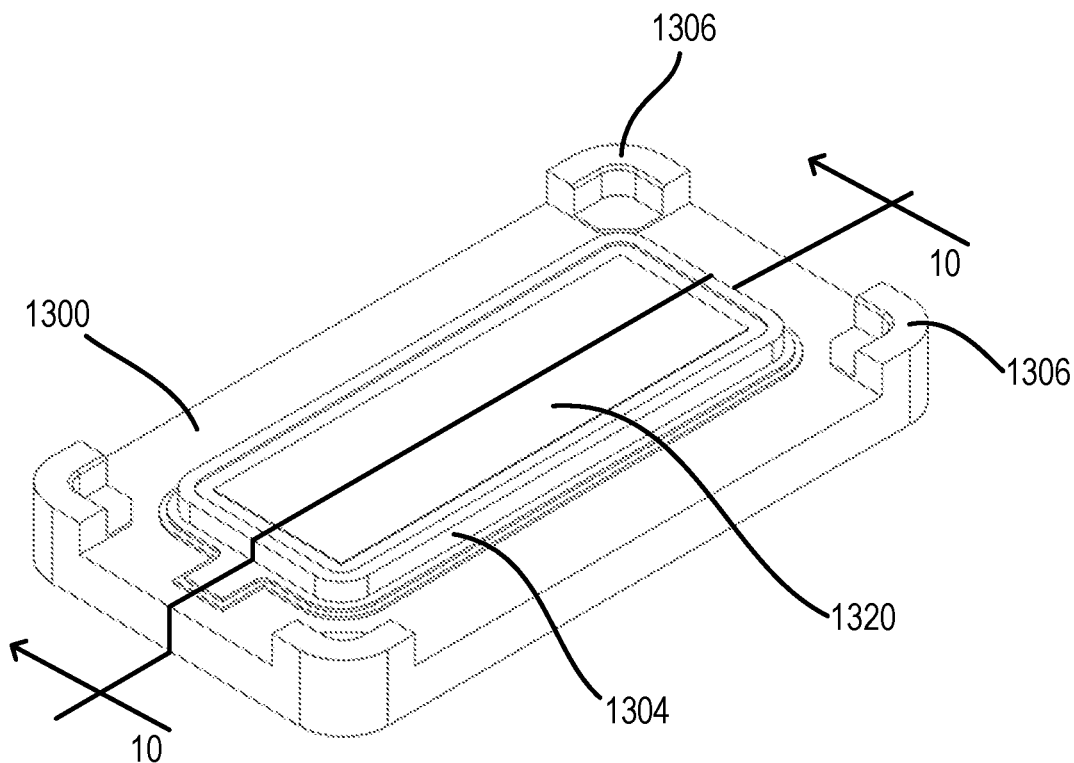
Figure 13D:
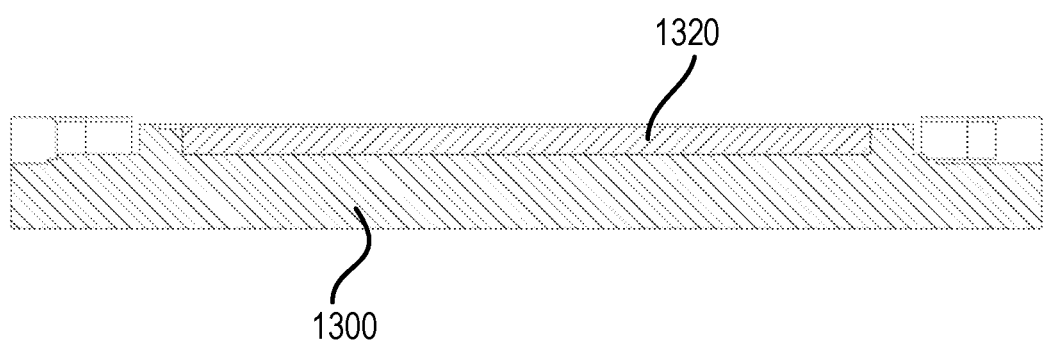
Figure 13E:
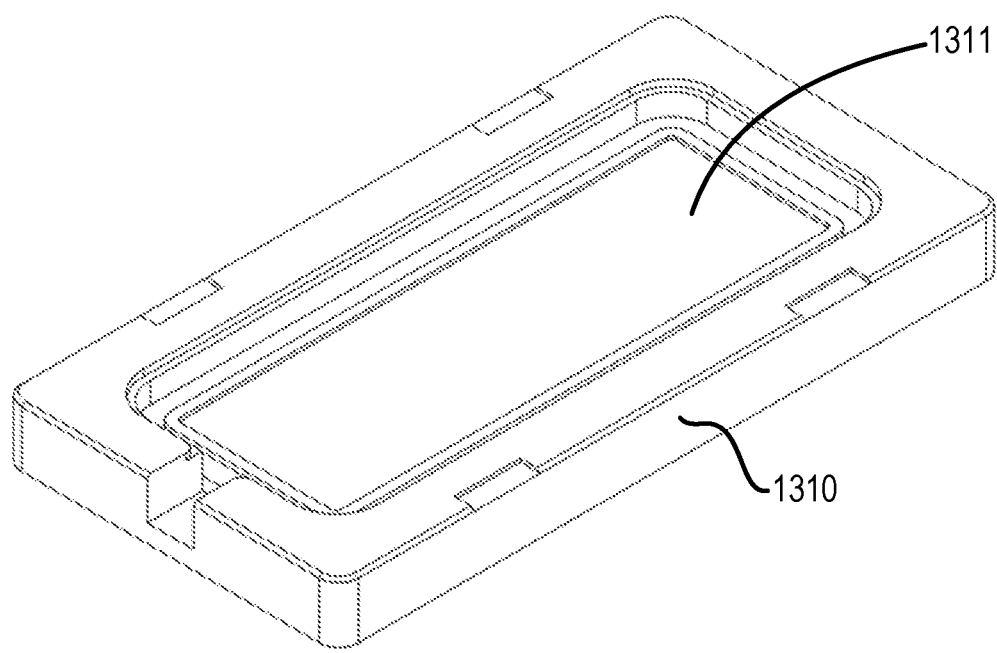
Figure 13F:
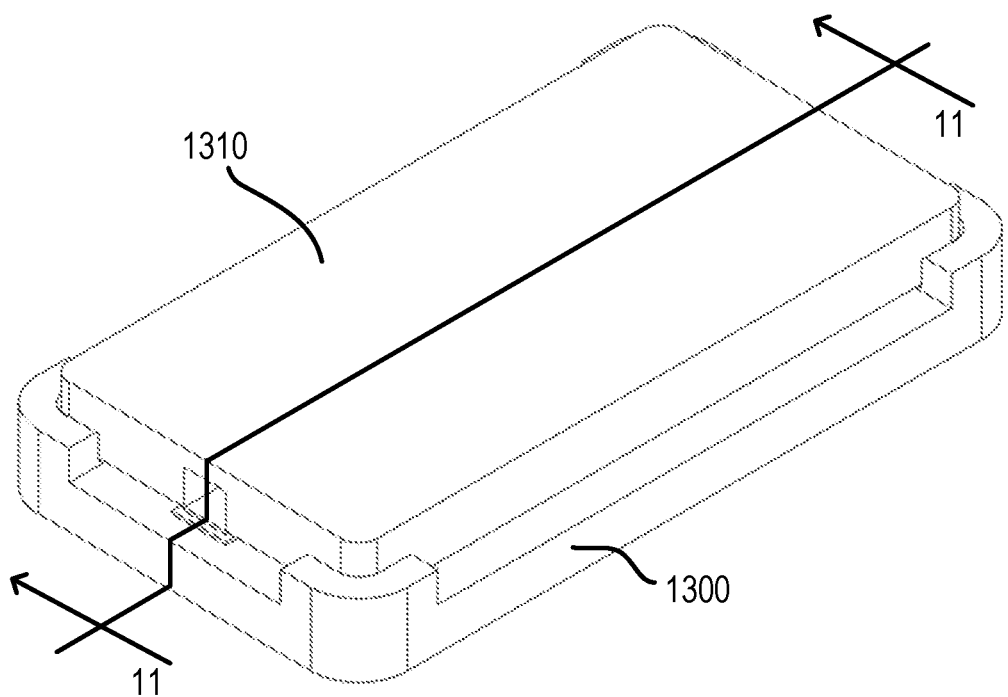
Figure 13G:
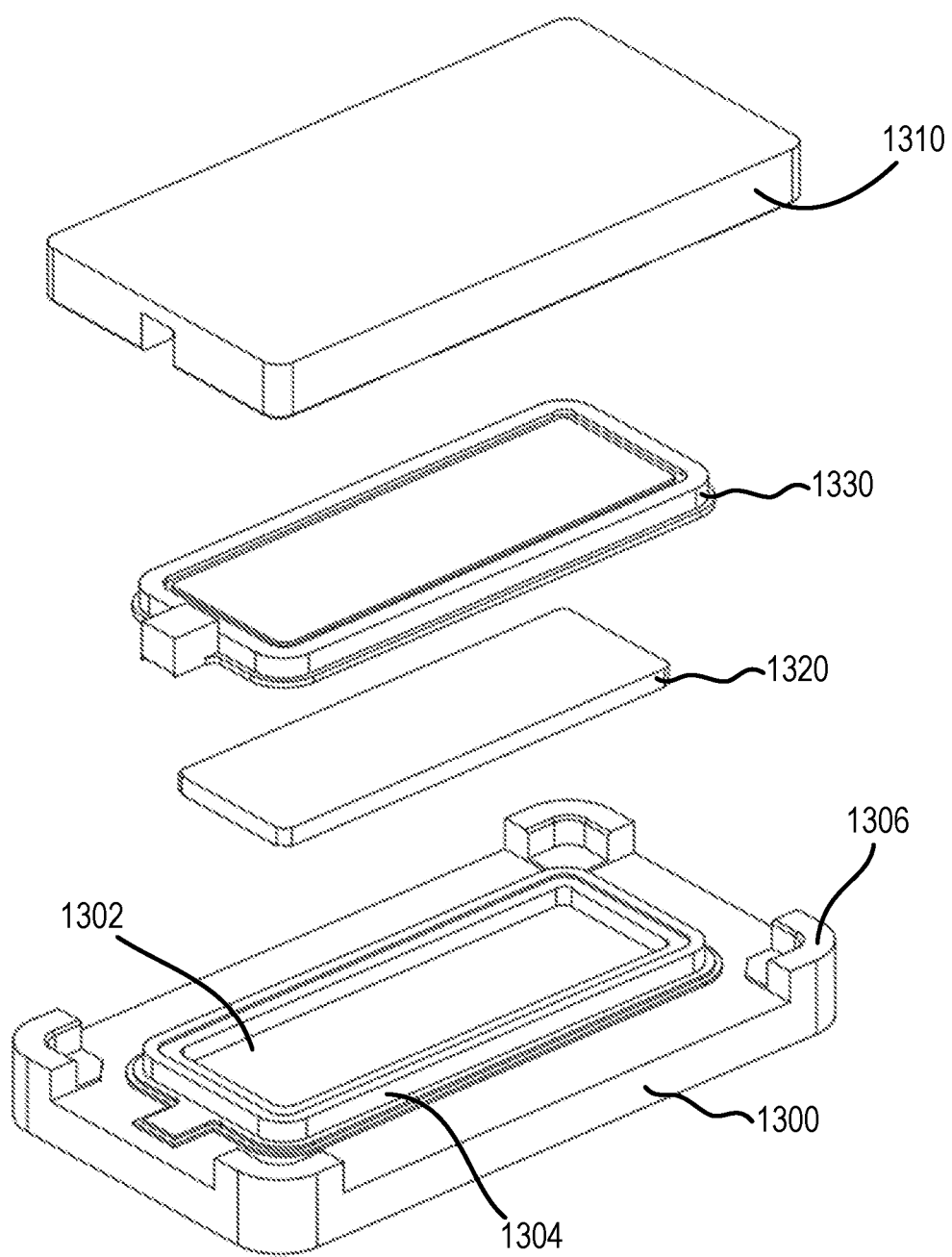
Figure 13H:
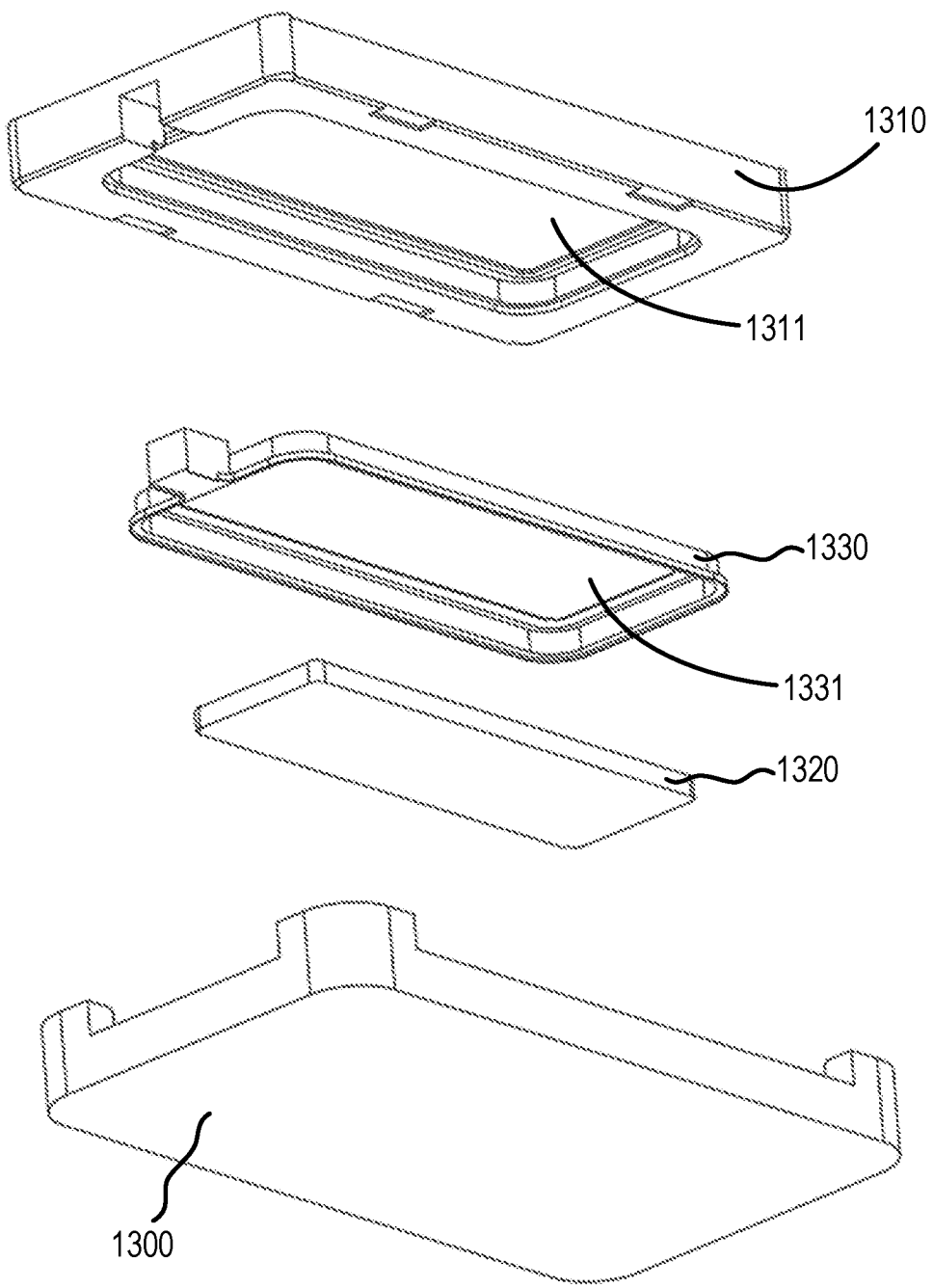
Figure 13I:
Figure 13J:
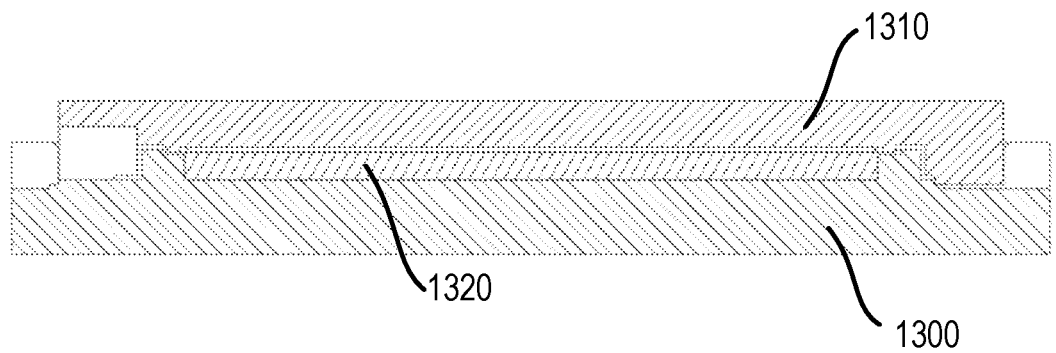
Figure 13K:
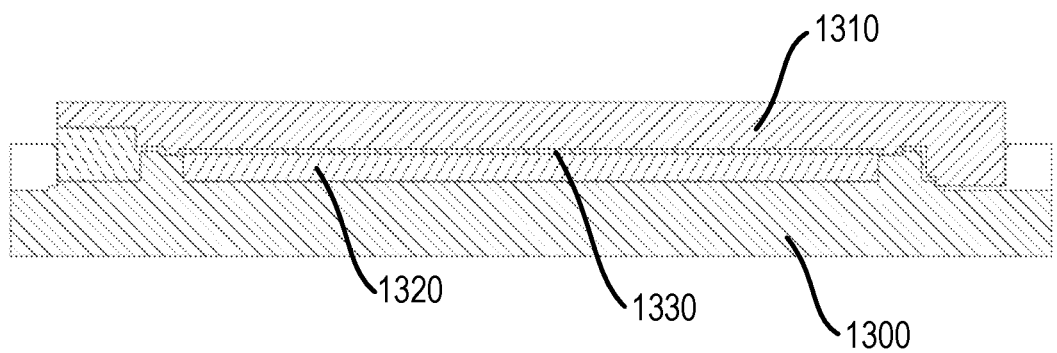

There are other alternatives for creating through-hole forming features. For example, as depicted in FIG. 9, instead of being formed entirely from the elastomer layer, a through-hole forming feature 940 can include a rigid support feature 942 that is made into the rigid tool body 922. In other aspects depicted in FIG. 10, a through-hole forming feature 1040 can be formed entirely from the rigid tool body 1022 extending above the elastomer layer 1028 and across the cavity 1030 into the elastomer layer 1028 of the top tool 1010. In other instances, a through-hole can be created by a pin 1140 that extends through the rigid tool body 1122 and the elastomer layer 1128 to extend across the cavity 1130 and into the elastomer layer 1118 of the other rigid tool body 1112.

In order to prevent flashing between the through-hole forming feature and the surface of the opposite tool, the through-hole forming feature can have a height slightly greater than the height of the cavity, thereby creating and interference seal with the opposing tool surface when the cavity is closed. For example, for a cavity height of 1 mm, the through-hole could have a height of 1.1 mm. Too much interference can cause deformation of the elastomer on the surface of the opposing tool, resulting in a protruding lip around the through-hole feature on the thermoformed part. One method of preventing deformation of the opposing elastomer is to decrease the thickness of the elastomer on the opposing tool in the region that will contact the through hole forming post. To achieve this, a protrusion can be added on the rigid layer below this elastomer in this area.

Draft angles can be introduced onto vertical surfaces in order to increase or decrease part adhesion of the thermoformed part to the tool. On opening the tool cavity, the embossed part may remain physically adhered to either the top or bottom tool. Typically, the part will stick to the side with a greater surface area and low and negative draft surfaces. Positive and negative draft angles can be incorporated into vertical surfaces of the tools in order to predictably control which side the tool the part will adhere to. For example a positive draft angle of 2o can be introduced to the cavity edge and through hole features on the bottom tool, to ensure that the part will adhere to the top tool.

The tool may contain a secondary "gate" cavity to allow excess material to flow out of the primary cavity during embossing. Material that has flowed into "gate" can be trimmed from the embossed piece after demolding. The tool can also contain one or multiple ports for introducing vacuum or purge to the mold cavity. These ports are preferably located on the vertical sides of the tool. Returning now to the first exemplary thermoplastic forming assemblage 100, a port 115 is formed of the elastomer material at an end of the bottom tool 120. As depicted most clearly in FIG. 1F, the port 115 is formed in a recess 115a in the rigid tool body 122 that is filled with the elastomer 115b.

Figure 3A:
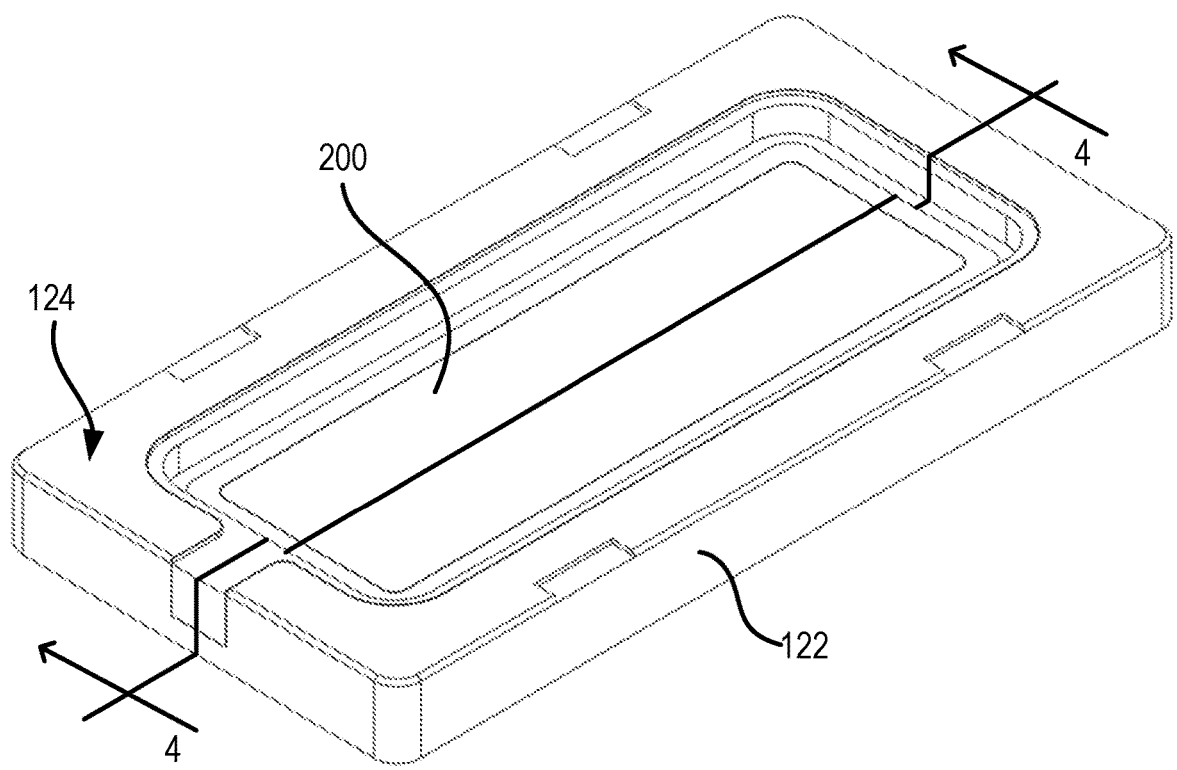
FIGS. 3A-3F are various views of the first exemplary thermoplastic forming assemblage from FIGS. 1A-1H containing an exemplary embossing blank from FIG. 2.
Figure 3B:
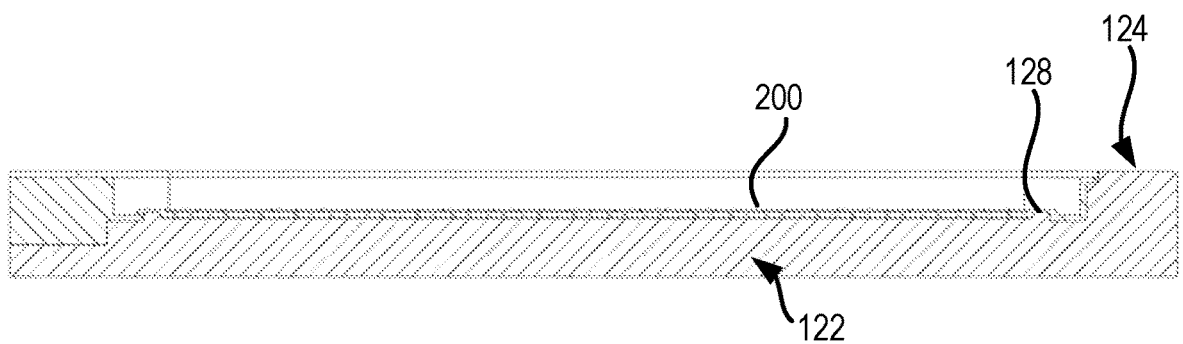
Figure 3C:
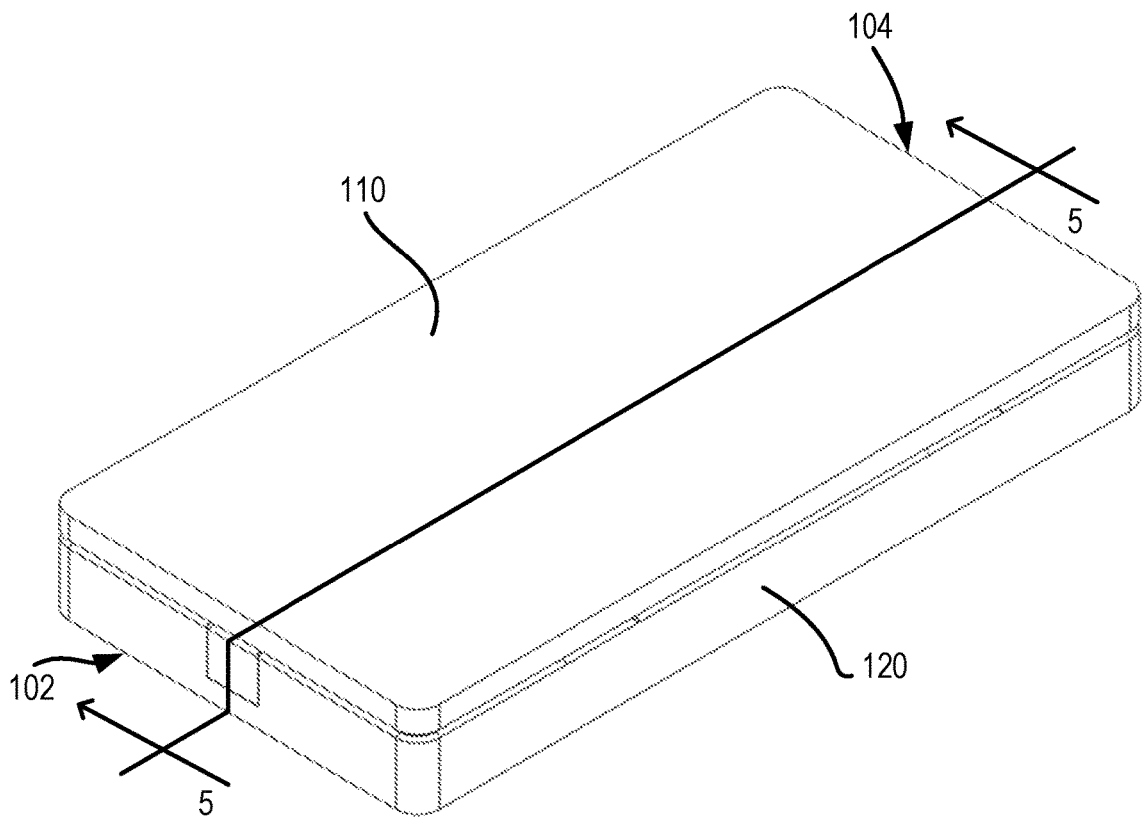
Figure 3D:
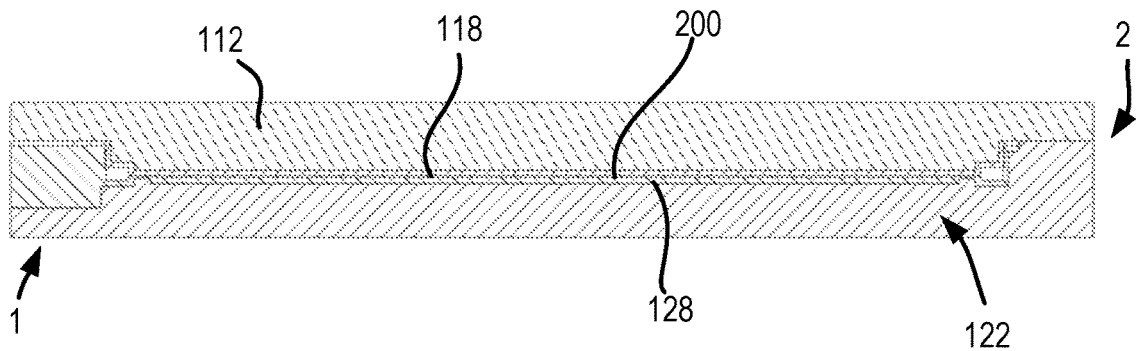
Figure 3E:
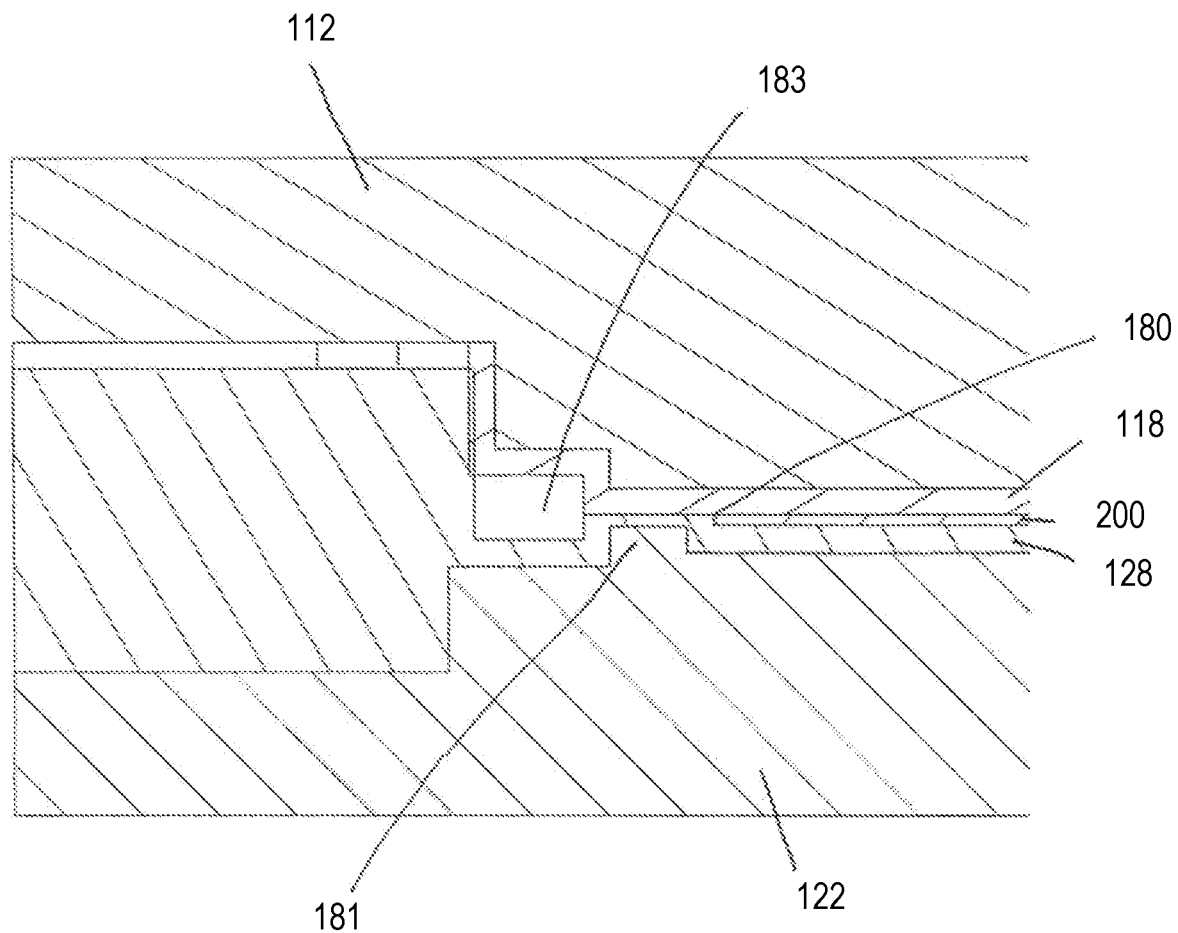
Figure 3F:
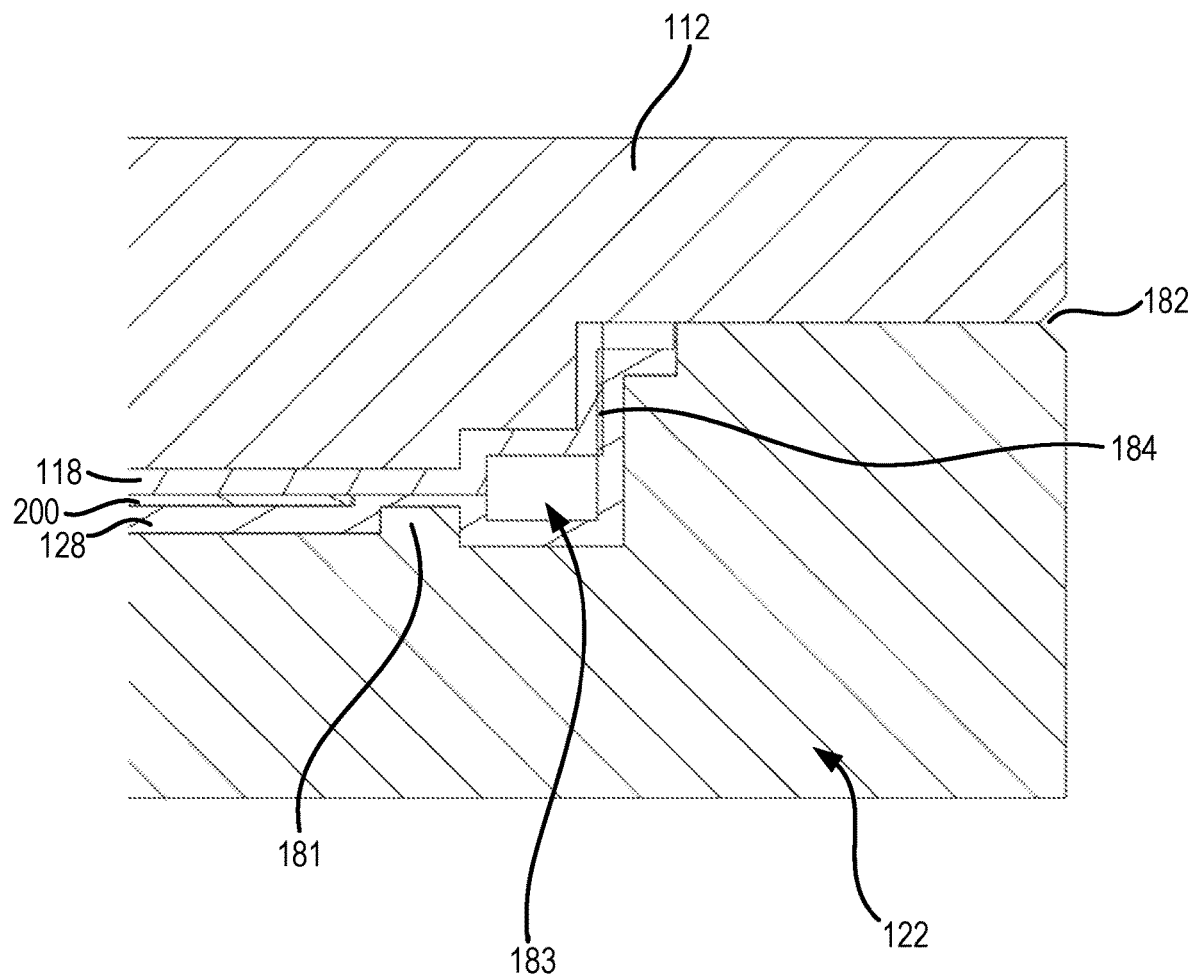

In some aspects, as best exemplified in FIGS. 3E-3F, a parting line 180 of the exemplary tool 100 is formed by an "cavity shutoff" 181. The cavity shutoff 181 is the contact area between the cavity forming surface 119 of the top tool 110 and the cavity forming surface 129 of the bottom tool 120 along the perimeter of the embossing cavity 130. In some aspects, the cavity shutoff will form a parting line that may be located at the bottom or top edge of the embossed part or anywhere in between. The e cavity shutoff 181 is designed to contain polymer within the cavity 130 when in a closed position during embossing in order to eliminate or minimize flashing and accurately reproduce the edges of the molded part.

In some aspects a "vacuum gap" 183 is introduced on the exterior of the cavity shutoff 181. The vacuum gap 183, along the perimeter of the cavity shutoff 181 serves a channel for pulling vacuum on the part. The vacuum gap 183 is sealed on one side by the cavity shutoff and sealed on another side by a "vacuum seal" 184 and is connected to the vacuum port. The vacuum seal 184 is designed to form a seal when the tooling is engaged (in a closed position) without interfering in the primary compression boundary of the tooling at the cavity shutoff 181. The vacuum seal can be designed to form a seal prior to reaching the closed position, thereby allowing the cavity to be evacuated before the cavity shutoff seal is engaged. One way of achieving this is to use a lateral gasket seal 184 which maintains a seal over a range of vertical positions of the top tool with respect to the bottom tool.

In some aspects, when the assemblage is in the closed position, the top and bottom tools make "hard contact", meaning that one rigid bottom facing surface from the top tool contacts one rigid top facing surface on the bottom tool. In this configuration, when the tool reaches the closed position under during embossing, any additional compressive load applied is carried by the rigid backing and does transfer to the embossed part. In addition, the final relative position of the top tool to the bottom tool is determined by the contact surface 182.

In another variation, the top and bottom tools operate in a floating configuration, whereby there is no contact between rigid surfaces, and all of the load applied during embossing is distributed over the elastomeric surface and the thermoformed substrate.

Blank Substrate "Blanks"

Figure 2:
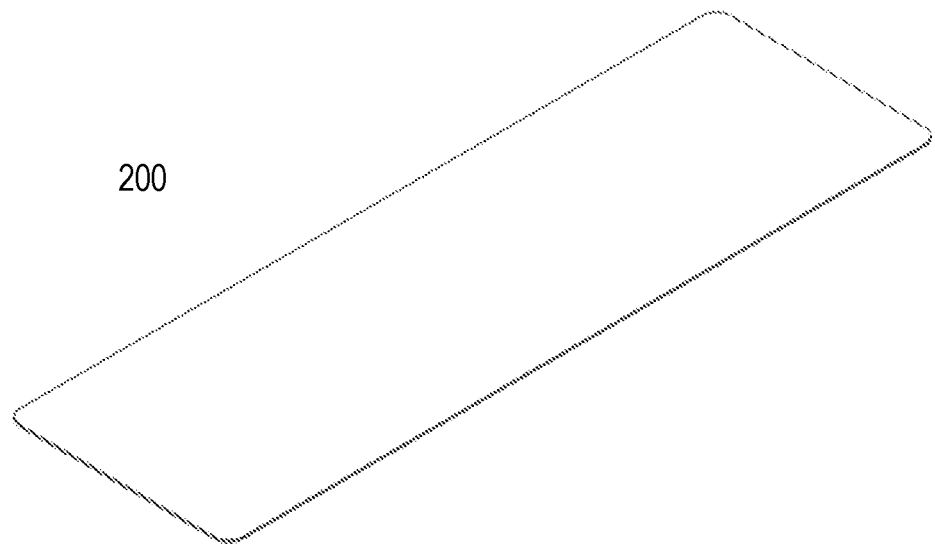
FIG. 2 is a perspective view of an exemplary embossing blank according to the various aspects of the disclosure.

The thermoplastic components can be made from a thermoplastic "blank" substrate. In some aspects, the blank substrate will have a volume within about 10%, about 5%, about 1%, or about 0.1% of a volume of the cavity formed by the first cavity-forming surface and the second cavity-forming surface. In some aspects, the blank volume will be slightly more than the cavity volume. This can be used to produce higher quality components with minimal or essentially zero flashing. An exemplary blank substrate 200 is depicted in FIG. 2, which is roughly the size of a standard microscope slide. However, the blank can in other applications have any volume or dimensions that accommodate the cavity volume of the tooling. In some aspects, blanks are not used at all, and the thermoplastic can be introduced as a thermoplastic grind or powder, or can be flowed in a molten or partially molten state into the chamber through a port or channel.

Suitable thermoplastic polymers include but are not limited to polyethylene (PE), polypropylene (PP), poly(vinyl chloride) (PVC), polycarbonate (PC), polyethylene terephthalate (PET), cyclic olefin polymer (COP), cyclic olefin copolymer (COC), poly(methyl methacrylate) (PMMA), or copolymers thereof and copolymers thereof with other polymers. Ideally the thermoplastic will have a melt flow index at the embossing temperature sufficient to allow full formation of the microfeatures to be embossed. The blank may also be made of a thermoset polymer such as a high temperature vulcanization (HTV) silicone, or an epoxy resin. The blank can also be a composite material such as a multilayer polymer laminate, or a polymer matrix filled with an inorganic additive such glass fiber, silica or clay. The blank material may also contain additives that are commonly added to injection molding resins such as antimicrobials, light absorptive agents, clarifying agents, mold release, slip agents, and antistatic additives.

Methods of Making Components

The thermoplastic forming tools and assemblages described herein can be used to make a variety of components from thermoplastics and, in some cases, from other materials such as polymer thermosets and composite materials. The methods can include hot embossing, injection molding, compression molding, and combinations or variations thereof.

In some aspects, the methods include a hot embossing method. The embossing process requires a thermoplastic forming tool or assemblage described herein, a polymer "blank" and a method of applying heat and/or pressure to the thermoplastic forming tool or assemblage. Typically, the polymer blank is first placed in the embossing tool cavity, the temperature of the tool and blank are then raised above the glass transition temperature of the blank material, and then pressure is applied to the blank forcing the polymer to flow and take the form of the cavity defined by the tool. The tool and blank are then cooled below the glass transition temperature of the polymer, after which the embossed thermoplastic component can be demolded from the cavity.

Embossing Cycle:

A standard embossing cycle can be conducted as follows. After the blank has been placed in the tooling, the mold is compressed to an initial "contact pressure" while evacuating the cavity of air through the vacuum port. The contact pressure ensures adequate thermal contact between the tools interior surfaces and the blank. While maintaining the contact force, the tool temperature is raised at a given ramp rate to the embossing temperature. Once the tool temperature has stabilized at the embossing temperature, the compressive force is ramped up to achieve the desired "embossing pressure" which is held for the duration of the "soak time". The soak time should be sufficiently long to allow the blank material to flow and fill all the recesses of the mold cavity. While maintaining the "embossing pressure", the mold is cooled to the demolding temperature after which the pressure on the mold is released.

Heating and cooling of the mold can be achieved by direct contact with a heated/cooled platen. Heating and cooling elements can also be directly embedded into the tooling. Other methods of heating include but are not limited to inductive heating and radiative heating of the mold. Other methods of cooling include thermoelectric cooling, and conductive or convective cooling with a cooling fluid or gas. Compressive force can be applied using a motorized linear stage, pneumatic or hydraulic press or under the gravitational force of a weight.

Vacuum can be applied to the cavity to evacuate any air or other vapors generated while heating the blank that get trapped between the polymer and recesses on the tooling surface. Evacuation of oxygen from the cavity also helps prevent thermal oxidation of the polymer during the embossing process. The cavity may also be purged with an inert gas such as nitrogen or argon. A combination of evacuation and purging can be used to minimize oxygen, moisture, and other contamination in the cavity.

In some aspects the equipment includes top and bottom thermally controlled platen mounted on a force controlled motorized compressive stage to which the tools can be mounted or otherwise placed on. The top and bottom platens are actively heated with embedded resistive heating cartridges and actively cooled with an embedded liquid cooling circuit running cooled water from a chiller. The top and bottom tools can sit freely on the bottom platen or they can be attached to the top and bottom platens respectively.

Part Removal:

Once the component has been cooled, the tool components are separated and the embossed part can be demolded from the tool. Venting the cavity with air or another suitable gas can be used to break the vacuum in the cavity and help eject the embossed structure from the tool(s). The cavity could be vented through the same port used for evacuating the cavity or one or multiple ports connecting to the cavity or vacuum channel The embossed part can be removed by uniformly pulling it in a directly normal to the surface of the tool or it may be lifted from one side of the part and gradually removed in a peeling motion. Removal for parts from the tool can be aided by incorporating ejector pins into the mold. Ejection pins can be mechanically, electrically or pneumatically activated. The ejection pins can be located in the main cavity, or alternatively in an overflow cavity where pins will contact an area that will be trimmed off after ejection. Ejection pins may be hidden underneath the elastomer layer—once activated the pin can deform stretch the elastomer layer and push on the molded part. This configuration allows use of ejector pins to eject the molded part without the appearance of visible features on the part associated with the discontinuity between ejector pins and the surrounding tool material. Placement and removal of blanks and embossed parts can be facilitated with automated equipment to increase throughput and reduce labor.

Tool Forming Structures and Methods of Use Thereof

Methods of making the thermoplastic forming tools and assemblage are also provided, including tool forming structures and methods of using the tool forming structures to make the tools described herein. The tool forming structures include a master structure that is the starting point for replication of a desired geometry. It can provide two functions: holding a fabricated piece or region containing the geometry of interest for replication, and defining other regions outside the geometry of interest that define the tooling used in the thermoforming process.

The fabricated piece held in the frame, referred to as an insert, is typically a microfabricated silicon or glass wafer but can be any material containing the desired geometry, formed by any natural or artificial method. Examples include a naturally micro-featured material, or a CNC machined, 3D printed, or previously thermoformed piece of plastic, metal, or rubber. Other methods of fabricating a microfeatured substrate include, but are not limited to, nanoimprint lithography, transfer printing, hot embossing, laser engraving, diamond scribing, 3D printing, self-assembly, laser induced etching, LIGA, electrochemical micromachining, ultraviolet, electron-beam or X-ray lithography.

The insert can be fabricated using multiple methods such as a combination of thermoforming and CNC machining. The insert can also be comprised of multiple components: for example a thin microstructured silicon wafer adhered to a thicker, more rigid carrier. The master structure is created from the combination of the frame with the insert, from which a tool can be cast. Tools are typically designed such that in pairs, they form an enclosed cavity that will thermoform a polymer of a specific size, clarity, global uniformity, and overall microfeature quality, and reproduces the geometry of interest from the original insert. The frame is typically made of a type of plastic, metal, or both depending on the application. CNC milling of an acrylic block would be one example of a standard procedure. The silicon wafer and optically clear insert are fastened to the master structure either mechanically, using a vacuum, with and adhesive or by some other method. Several types of adhesives can be applied; such as, double-sided tape, spray adhesive, or glue. In order to mechanically fasten the insert, the frame can be comprised of top and bottom pieces between which the insert can be clamped. The master structures are used to cast soft heat-resistant elastomer tools.

As depicted in FIGS. 12A-12K a first exemplary tool-forming structure 1200 is described that can be used for coating a conformal elastomer layer 1230 on a rigid tool body 1210. The tool-forming structure 1200 includes a machined pocket 1202 configured to receive an insert 1220 for defining a cavity-forming surface in the conformal elastomer layer when coated. The machined pocket 1202 is surrounded by a ridge 1204 that contacts the rigid tool body 1210 when in a closed position for creating the coating of the conformal elastomer layer. The tool-forming structure 1200 can further include reference tabs 1206 to align the rigid tool body. The rigid tool body can include, for example, a machined aluminum tool body. The machined pocket 1202 can be recessed as depicted in FIGS. 12A-12K. This works well for when the rigid tool body 1210 has a protrusion 1211. The insert 1220 can be a microfabricated silicon insert having a featured surface 1221 which can be transferred as a negative onto the elastomer layer 1230 to define a feature forming surface 1231. The elastomer layer can have a thickness between 10 micrometers and 5 millimeters. In practice, layer thickness between 250 micrometers and 500 micrometers have been most practical for thermoforming of final plastic parts of thickness between 50 micrometers and 5 millimeters. The machined aluminum backing is typically 2 millimeters to 20 millimeters thick, and is typically as uniform as possible in order to provide an even heat distribution during embossing.

A second exemplary tool-forming structure 1300 is described that can be used for coating a conformal elastomer layer 1330 on a rigid tool body 1310. The tool-forming structure 1300 includes a machined pocket 1302 configured to receive an insert 1320 for defining a cavity-forming surface in the conformal elastomer layer when coated. The machined pocket 1302 is on a raised platform 1304 that defines a thickness of the conformal elastomer layer when coated. The tool-forming structure 1300 can further include reference tabs 1306 to align the rigid tool body. The rigid tool body 1310 can include, for example, a machined aluminum tool body. The machined pocket 1302 can be on a raised platform 1302 as depicted in FIGS. 13A-13K. This works well for when the rigid tool body 1310 has a recess 1311. The insert 1320 can be an optical acrylic insert which can be transferred as a negative onto the elastomer layer 1330 to define an optically clear surface 1331.

Casting of Elastomer onto Rigid Tool Bodies

In preparation of casting, a silanization treatment of the silicon wafer is used to chemically passivate the surface of the wafer to avoid any elastomer adhesion during casting. This process involves activation of the silicon surface with ozone bombardment followed by exposure under vacuum to silane vapor. Other methods to activate the silicon surface with hydroxyl groups include but are not limited to plasma or corona bombardment or a piranha etch. The anti-stiction layers include but are not limited to alkyl silanes, and fluoroalky silanes applied from solution or physical vapor deposition. Anti-stiction coatings such as PTFE (polytetrafluoroethylene) can also be applied via a plasma deposition.

An example of another method to cast the elastomer is to inject the uncured liquid elastomer into the cavity between the master and rigid backing. In this example, one or more injection and outlet ports are created in either the master or rigid backing, providing a path to inject elastomer into the cavity formed between master and backing when they are seated and clamped together. The mixed and degassed uncured elastomer is injected into the cavity by pulling a vacuum on the outlet port, applying positive pressure to elastomer at the inlet port, or both.

The elastomer layer may be cast onto the rigid backing in multiple casting to create overmold features. As an example, the first elastomer layer is cast and cured as described above onto the rigid backing using one master structure with a given set micro and macros structures to form a preliminary casting. A secondary casting is then performed using the preliminary casting and a second master. The second master contains the features to be overmolded on the preliminary casting. The overmolded features can overlap but do not with the features preliminary casting A vapor polish treatment is applied to the machined acrylic masters using dichloromethane to aid release from the cured elastomer. Each acrylic master has tape applied on all sides to prevent leakage of liquid elastomer during degassing. A 10:1 mixture of silicone monomer to cross-linker is poured within each acrylic frame and degassed for 1.5 hours. To bond the elastomer and aluminum, sand paper is used to abrade the contact surface. The tape is then removed from the acrylic frame and placed on a glass plate for clamping. The aluminum backing is placed securely in line with the reference tabs of the acrylic frame and clamped with another glass plate until all the excess elastomer has escaped. The curing process consists of a clamped degrees Celsius cure for 3-4 hours and an unclamped 24-hour final cure at 200 degrees Celsius. After the initial cure, a spatula is used to gently pry the acrylic master from the elastomer bonded aluminum hybrid tool. The hybrid tool then undergoes a final cure. The hybrid tools are cooled, and any additional elastomer flash is cut away with clippers.

Certain Aspects According to the Disclosure

The above disclosure will be better understood upon reading the following numbered aspects which should not be confused with the claims. In some instances, one or more of the numbered aspects can be combined with other aspects described herein without departing from the disclosure.

Aspect 1. A thermoplastic forming assemblage for forming a thermoplastic component having precision micro-scale features and reproducible macro-scale dimensions, the thermoplastic forming assemblage comprising: (a) a top tool comprising: a first rigid tool body having a first cavity-forming side; and a first elastomer layer conformally coating at least a portion of the first cavity-forming side to create a first cavity-forming surface; and (b) a bottom tool comprising: a second rigid tool body have a second cavity-forming side and a second elastomer layer conformally coating at least a portion of the second cavity-forming side to create a second cavity-forming surface.

Aspect 2. The thermoplastic forming assemblage according to any one of Aspects 1-37, wherein, when in a closed position, the first cavity-forming surface and the second cavity-forming surface define a cavity for forming the thermoplastic component.

Aspect 3. The thermoplastic forming assemblage according to any one of Aspects 1-37, wherein one or both of the first cavity-forming surface and the second cavity-forming surface comprise a feature-forming surface that define the precision micro-scale features when forming the thermoplastic component.

Aspect 4. The thermoplastic forming assemblage according to any one of Aspects 1-37, wherein the first rigid tool body and the second rigid tool body are effective to provide the reproducible macro-scale dimensions in the thermoplastic component when formed.

Aspect 5. The thermoplastic forming assemblage according to any one of Aspects 1-37, wherein the first elastomer layer and the second elastomer layer are effective to form the precision micro-scale features in the thermoplastic component and to release the precision micro-scale features when formed.

Aspect 6. The thermoplastic forming assemblage according to any one of Aspects 1-37, wherein one or both of the first cavity-forming surface and the second cavity-forming surface comprise a recess.

Aspect 7. The thermoplastic forming assemblage according to any one of Aspects 1-37, wherein the second cavity-forming side of the second rigid tool body comprises a recess with the second elastomer layer conformally coating the recess.

Aspect 8. The thermoplastic forming assemblage according to any one of Aspects 1-37, wherein the second elastomer layer comprises a recess.

Aspect 9. The thermoplastic forming assemblage according to any one of Aspects 1-37, wherein the first cavity-forming side of the first rigid tool body comprises at least one protrusion with the first elastomer layer conformally coating at least a portion of the at least one protrusion.

Aspect 10. The thermoplastic forming assemblage according to any one of Aspects 1-37, wherein the recess is configured to receive the at least one protrusion when in the closed position.

Aspect 11. The thermoplastic forming assemblage according to any one of Aspects 1-37, wherein the first elastomer layer comprises at least one protrusion.

Aspect 12. The thermoplastic forming assemblage according to any one of Aspects 1-37, wherein the recess is configured to receive the at least one protrusion when in the close position.

Aspect 13. The thermoplastic forming assemblage according to any one of Aspects 1-37, wherein one or both of the first elastomer layer and the second elastomer layer have a thickness ranging from about 50 micrometers to about 5 millimeters.

Aspect 14. The thermoplastic forming assemblage according to any one of Aspects 1-37, wherein one of both of a thickness variation of the first elastomer layer and a thickness variation of the second elastomer layer is about 10% or less.

Aspect 15. The thermoplastic forming assemblage according to any one of Aspects 1-37, wherein one or both of the first rigid tool body and the second rigid tool body comprises aluminum, copper, steel, plastic, ceramic, or alloys thereof.

Aspect 16. The thermoplastic forming assemblage according to any one of Aspects 1-37, wherein one or both of the first elastomer layer and the second elastomer layer comprise an elastomer selected from the group consisting of silicone rubber, fluorosilicone, fluoroelastomer (FKM), perfluoroelastomer (FFKM), ethylene acrylic elastomer, nitrile butadiene rubber (NBR), hydrogenated nitrile butadiene rubber (HNBR), ethylene propylene diene monomer (EPDM) rubber, butyl rubber, and a combination thereof.

Aspect 17. The thermoplastic forming assemblage according to any one of Aspects 1-37, wherein the thermoplastic forming assemblage comprises a cavity shutoff at an interface between the first elastomer layer and the second elastomer layer at a perimeter of the cavity when in the closed position.

Aspect 18. The thermoplastic forming assemblage according to any one of Aspects 1-37, wherein a portion of the first cavity-forming side and a portion of the second cavity forming side contact when in the closed position to form a rigid contact limiting a degree of compression of the bottom tool and the top tool.

Aspect 19. The thermoplastic forming assemblage according to any one of Aspects 1-37, wherein, when in the closed position, the first elastomer layer and the second elastomer layer form a void space along a perimeter of the cavity.

Aspect 20. The thermoplastic forming assemblage according to any one of Aspects 1-37, wherein the cavity shutoff forms a side of the void space located between the void space and the cavity.

Aspect 21. The thermoplastic forming assemblage according to any one of Aspects 1-37, wherein one or both of the cavity shutoff and the void space extend around an entire perimeter of the cavity.

Aspect 22. The thermoplastic forming assemblage according to any one of Aspects 1-37, wherein, when in the closed position, the first elastomer layer and the second elastomer layer contact at an interface substantially perpendicular to both the first cavity-forming side and the second cavity forming side to form a gasket sealing the void space.

Aspect 23. The thermoplastic forming assemblage according to any one of Aspects 1-37, further comprising a heating element for one or both of the first rigid tool body and the second rigid tool body.

Aspect 24. The thermoplastic forming assemblage according to any one of Aspects 1-37, further comprising a cooling element for one or both of the first rigid tool body and the second rigid tool body.

Aspect 25. The thermoplastic forming assemblage according to any one of Aspects 1-37, wherein the thermoplastic forming assemblage comprises a mold for hot embossing the thermoplastic component or a mold for injection molding the thermoplastic component.

Aspect 26. The thermoplastic forming assemblage according to any one of Aspects 1-37, wherein the micro-scale features have aspect ratios of about 1:50 to about 50:1.

Aspect 27. The thermoplastic forming assemblage according to any one of Aspects 1-37, wherein the micro-scale features have a non-negative draft angle.

Aspect 28. The thermoplastic forming assemblage according to any one of Aspects 1-37, wherein the micro-scale features have a negative draft angle.

Aspect 29. The thermoplastic forming assemblage according to any one of Aspects 1-37, wherein the micro-scale features have dimensions from about 100 nm to about 1 mm or from about 10 µm to about 250 µm.

Aspect 30. The thermoplastic forming assemblage according to any one of Aspects 1-37, wherein the first rigid tool body has a first thickness and the second rigid tool body has a second thickness.

Aspect 31. The thermoplastic forming assemblage according to any one of Aspects 1-37, wherein one or both of the first thickness and the second thickness are about 500 µm to 50 mm.

Aspect 32. The thermoplastic forming assemblage according to any one of Aspects 1-37, wherein the bottom tool comprises a plurality of recesses.

Aspect 33. The thermoplastic forming assemblage according to any one of Aspects 1-37, wherein each recess in the plurality of recesses is coated with an elastomer layer conformally coating the recess so as to create a plurality of second cavity forming surfaces.

Aspect 34. The thermoplastic forming assemblage according to any one of Aspects 1-37, wherein the top tool comprises a plurality of protrusions.

Aspect 35. The thermoplastic forming assemblage according to any one of Aspects 1-37, wherein each protrusion in the plurality of protrusions is coated with an elastomer layer conformally coating the protrusion to form a plurality of the first cavity forming surfaces.

Aspect 36. The thermoplastic forming assemblage according to any one of Aspects 1-37, wherein the plurality of first cavity forming surfaces and the plurality of second cavity forming surfaces, when in the closed position, form a cavity for forming a plurality of thermoplastic components.

Aspect 37. The thermoplastic forming assemblage according to any one of Aspects 1-36, wherein the thermoplastic forming assemblage comprises a plurality of top tools; wherein each of the top tools comprise a protrusion coated with an elastomer layer conformally coating the protrusion to form a first cavity forming surface on each of the top tools in the plurality of top tools; and wherein the plurality of first cavity forming surfaces and the plurality of second cavity forming surfaces, when in the closed position, form a cavity for forming a plurality of thermoplastic components.

It should be emphasized that the above-described aspects of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A thermoplastic forming assemblage for forming a thermoplastic component having precision micro-scale features and reproducible macro-scale dimensions, the thermoplastic forming assemblage comprising:
   (a) a top tool comprising:
   a first rigid tool body having a first cavity-forming side; and
   a first elastomer layer conformally coating at least a portion of the first cavity-forming side to create a first cavity-forming surface; and
   (b) a bottom tool comprising:
   a second rigid tool body have a second cavity-forming side and a second elastomer layer conformally coating at least a portion of the second cavity-forming side to create a second cavity-forming surface;
   wherein, when in a closed position, the first cavity-forming surface and the second cavity-forming surface define a cavity for forming the thermoplastic component;
   wherein one or both of the first cavity-forming surface and the second cavity-forming surface comprise a feature-forming surface that define the precision micro-scale features when forming the thermoplastic component;
   wherein the first rigid tool body and the second rigid tool body are effective to provide the reproducible macro-scale dimensions in the thermoplastic component when formed;
   wherein the first elastomer layer and the second elastomer layer are effective to form the precision micro-scale features in the thermoplastic component and to release the precision micro-scale features when formed; and
   wherein, when in the closed position, the first elastomer layer and the second elastomer layer form a void space along a perimeter of the cavity, and wherein the thermoplastic forming assemblage comprises a cavity shut-off at an interface between the first elastomer layer and the second elastomer layer at a perimeter of the cavity when in the closed position.

2. The thermoplastic forming assemblage according to claim 1, wherein one or both of the first cavity-forming surface and the second cavity-forming surface comprise a recess.

3. The thermoplastic forming assemblage according to claim 2, wherein the first cavity-forming side of the first rigid tool body comprises at least one protrusion with the first elastomer layer conformally coating at least a portion of the at least one protrusion; and
   wherein the recess is configured to receive the at least one protrusion when in the closed position.

4. The thermoplastic forming assemblage according to claim 3, wherein the first elastomer layer comprises at least one protrusion; and
   wherein the recess is configured to receive the at least one protrusion when in the close position.

5. The thermoplastic forming assemblage according to acclaim 1, wherein the second cavity-forming side of the second rigid tool body comprises a recess with the second elastomer layer conformally coating the recess.

6. The thermoplastic forming assemblage according to claim 1, wherein the second elastomer layer comprises a recess.

7. The thermoplastic forming assemblage according to claim 1, wherein one or both of the first elastomer layer and the second elastomer layer have a thickness ranging from about 50 micrometers to about 5 millimeters.

8. The thermoplastic forming assemblage according to claim 1, wherein one of both of a thickness variation of the first elastomer layer and a thickness variation of the second elastomer layer is about 10% or less.

9. The thermoplastic forming assemblage according to claim 1, wherein one or both of the first rigid tool body and the second rigid tool body comprises aluminum, copper, steel, plastic, ceramic, or alloys thereof.

10. The thermoplastic forming assemblage according to claim 1, wherein one or both of the first elastomer layer and the second elastomer layer comprise an elastomer selected from the group consisting of silicone rubber, fluorosilicone, fluoroelastomer (FKM), perfluoroelastomer (FFKM), ethylene acrylic elastomer, nitrile butadiene rubber (NBR), hydrogenated nitrile butadiene rubber (HNBR), ethylene propylene diene monomer (EPDM) rubber, butyl rubber, and a combination thereof.

11. The thermoplastic forming assemblage according to claim 1, wherein the thermoplastic forming assemblage comprises a cavity shutoff at an interface between the first elastomer layer and the second elastomer layer at a perimeter of the cavity when in the closed position.

12. The thermoplastic forming assemblage according to claim 1, wherein a portion of the first cavity-forming side and a portion of the second cavity forming side contact when in the closed position to form a rigid contact limiting a degree of compression of the bottom tool and the top tool.

13. The thermoplastic forming assemblage according to claim 1, wherein the cavity shutoff forms a side of the void space located between the void space and the cavity.

14. The thermoplastic forming assemblage according to claim 1, wherein one or both of the cavity shutoff and the void space extend around an entire perimeter of the cavity.

15. The thermoplastic forming assemblage according to claim 14, wherein, when in the closed position, the first elastomer layer and the second elastomer layer contact at an interface substantially perpendicular to both the first cavity-forming side and the second cavity forming side to form a gasket sealing the void space.

16. The thermoplastic forming assemblage according to claim 1, wherein, when in the closed position, the first elastomer layer and a second elastomer layer contact at an interface substantially perpendicular to both the first cavity-forming side and the second cavity forming side to form a gasket sealing the void space.

17. The thermoplastic forming assemblage according to claim 16, further comprising a heating element for one or both of the first rigid tool body and the second rigid tool body.

18. The thermoplastic forming assemblage according to 1, further comprising a heating element for one or both of the first rigid tool body and the second rigid tool body.

19. The thermoplastic forming assemblage according to claim 1, further comprising a cooling element for one or both of the first rigid tool body and the second rigid tool body.

20. The thermoplastic forming assemblage according to claim 1, wherein the thermoplastic forming assemblage comprises a mold for hot embossing the thermoplastic component or a mold for injection molding the thermoplastic component.

21. The thermoplastic forming assemblage according to claim 1, wherein the precision micro-scale features have a negative draft angle.

22. The thermoplastic forming assemblage according to claim 1, wherein the bottom tool comprises a plurality of recesses,
wherein each recess in the plurality of recesses is coated with an elastomer layer conformally coating the recess so as to create a plurality of second cavity forming surfaces.

23. The thermoplastic forming assemblage according to claim 22, wherein the top tool comprises a plurality of protrusions,
wherein each protrusion in the plurality of protrusions is coated with an elastomer layer conformally coating the protrusion to form a plurality of the first cavity forming surfaces; and
wherein the plurality of first cavity forming surfaces and the plurality of second cavity forming surfaces, when in the closed position, form a cavity for forming a plurality of thermoplastic components.

24. The thermoplastic forming assemblage according to claim 22, wherein the thermoplastic forming assemblage comprises a plurality of top tools;
wherein each of the top tools comprise a protrusion coated with an elastomer layer conformally coating the protrusion to form a first cavity forming surface on each of the top tools in the plurality of top tools; and
wherein the plurality of first cavity forming surfaces and the plurality of second cavity forming surfaces, when in the closed position, form a cavity for forming a plurality of thermoplastic components.

* * * * *